United States Patent
Ejiri et al.

(10) Patent No.: US 12,219,059 B2
(45) Date of Patent: Feb. 4, 2025

(54) UTILIZATION MANAGEMENT SYSTEM, MANAGEMENT DEVICE, UTILIZATION CONTROL DEVICE, USER TERMINAL, UTILIZATION MANAGEMENT METHOD, AND PROGRAM

(71) Applicant: BITKEY INC., Tokyo (JP)

(72) Inventors: Yuki Ejiri, Tokyo (JP); Hiroshi Yamamoto, Tokyo (JP)

(73) Assignee: BITKEY INC., Tokyo (JP)

( * ) Notice: Subject to any disclaimer, the term of this patent is extended or adjusted under 35 U.S.C. 154(b) by 259 days.

(21) Appl. No.: 17/637,560

(22) PCT Filed: Jan. 24, 2020

(86) PCT No.: PCT/JP2020/002638
§ 371 (c)(1),
(2) Date: Feb. 23, 2022

(87) PCT Pub. No.: WO2021/038903
PCT Pub. Date: Mar. 4, 2021

(65) Prior Publication Data
US 2022/0278840 A1    Sep. 1, 2022

(30) Foreign Application Priority Data

Aug. 28, 2019  (JP) ................. 2019-155952

(51) Int. Cl.
*H04L 9/14*    (2006.01)
*H04L 9/08*    (2006.01)
*H04W 4/80*    (2018.01)

(52) U.S. Cl.
CPC .............. *H04L 9/14* (2013.01); *H04L 9/0825* (2013.01); *H04W 4/80* (2018.02); *H04L 2209/80* (2013.01)

(58) Field of Classification Search
CPC ......... H04L 9/14; H04L 2209/80; H04W 4/80
See application file for complete search history.

(56) References Cited

U.S. PATENT DOCUMENTS

| | | | |
|---|---|---|---|
| 2002/0116343 A1 | 8/2002 | Nakamura et al. |
| 2004/0093309 A1 | 5/2004 | Nakamura et al. |
| | (Continued) | | |

FOREIGN PATENT DOCUMENTS

| | | |
|---|---|---|
| JP | 2002-197224 A | 7/2002 |
| JP | 2003-132435 | 5/2003 |
| | (Continued) | |

OTHER PUBLICATIONS

International Search Report with English Translation for PCT/JP2020/002638, mailed Apr. 14, 2020, 5 pages.

(Continued)

*Primary Examiner* — Jonathan A Bui
(74) *Attorney, Agent, or Firm* — Nixon & Vanderhye P.C.

(57) ABSTRACT

The present invention reduces security risks while improving the convenience of use management technology for a usage target object. A utilization control device (1), upon receiving hole data with a first signature from a provider terminal (3), verifies the first signature by using a first public key, to set the hole data to the device (1) itself when the signature verification is established. Furthermore, upon receiving a use permit with a second signature from a user terminal (4), the utilization control device (1) verifies the second signature by using a second public key included in the hole data, transmits a nonce to the user terminal (4), receives a third signature to the nonce from the user terminal (4), and verifies the third signature by using a third public key included in the use permit. When the second and third signature verifications are both established, the utilization control device (1) refers to transaction information included in the use permit, and lifts restriction on use of the usage (Continued)

target object (house 50) when conditions identified by the transaction information are satisfied.

19 Claims, 21 Drawing Sheets

(56) References Cited

U.S. PATENT DOCUMENTS

| | | | | |
|---|---|---|---|---|
| 2016/0212137 A1* | 7/2016 | Pottier | ................ | H04L 63/101 |
| 2017/0236343 A1* | 8/2017 | Leboeuf | ................ | G07C 9/20 |
| | | | | 340/5.61 |
| 2018/0041484 A1* | 2/2018 | Gifford | ................ | H04L 9/3247 |

FOREIGN PATENT DOCUMENTS

| | | |
|---|---|---|
| JP | 2006-233475 | 9/2006 |
| JP | 2017-216596 | 12/2017 |
| JP | 2018-98553 | 6/2018 |

OTHER PUBLICATIONS

Written Opinion of the ISA for PCT/JP2020/002638, mailed Apr. 14, 2020, 3 pages.
English machine translation of JP 2006-233475 A (29 pages).

* cited by examiner

Fig.10 User terminal 4

Fig.12

User information storage part 221

| User ID | Password | Address information | Personal information | Third public key |
|---|---|---|---|---|
| A0001 | **** | ***** | ****************** | ***** |
| A0002 | **** | ***** | ****************** | ***** |
| ⋮ | ⋮ | ⋮ | ⋮ | ⋮ |

Fig.13

Provider information storage part 222

| User ID | Password | Address information | Personal information |
|---------|----------|---------------------|----------------------|
| B001 | **** | ***** | ****************** |
| B002 | **** | ***** | ****************** |
| ⋮ | ⋮ | ⋮ | ⋮ |

Fig.14

Object data storage part 223

| Object ID (2231) | First public key (2232) | First secret key (2233) | Facility information (2234) | User ID (2235) | |
|---|---|---|---|---|---|
| C001 | **** | **** | ****************** | B005 | } 2230 |
| C002 | **** | **** | ****************** | B007 | } 2230 |
| ⋮ | ⋮ | ⋮ | ⋮ | ⋮ | ⋮ |

Fig.15

Hole data storage part 224

| Hole ID (2241) | Second public key (2242) | Second secret key (2243) | Common key (2244) | Object ID (2245) | |
|---|---|---|---|---|---|
| E001 | **** | **** | **** | C001 | } 2240 |
| E002 | **** | **** | **** | C002 | } 2240 |
| ⋮ | ⋮ | ⋮ | ⋮ | ⋮ | ⋮ |

Fig.16

Transaction information storage part 225

| Transaction ID (2256) | Object ID (2251) | User ID (user) (2252) | Provider ID (Provider) (2253) | Desire information (2254) | User permit obtainable time (2255) | |
|---|---|---|---|---|---|---|
| D001 | C002 | A008 | B007 | Usable period start time : ***** <br> Usable period end time : ***** <br> Number of times of use : **** | 2018/12/21 9:00~ | } 2250 |
| D002 | C001 | A005 | B005 | Usable period start time : ***** <br> Usable period end time : ***** <br> Number of times of use : **** | 2018/12/21 11:00~ | } 2250 |
| ⋮ | ⋮ | ⋮ | ⋮ | ⋮ | ⋮ | ⋮ |

Object registration request processing S405

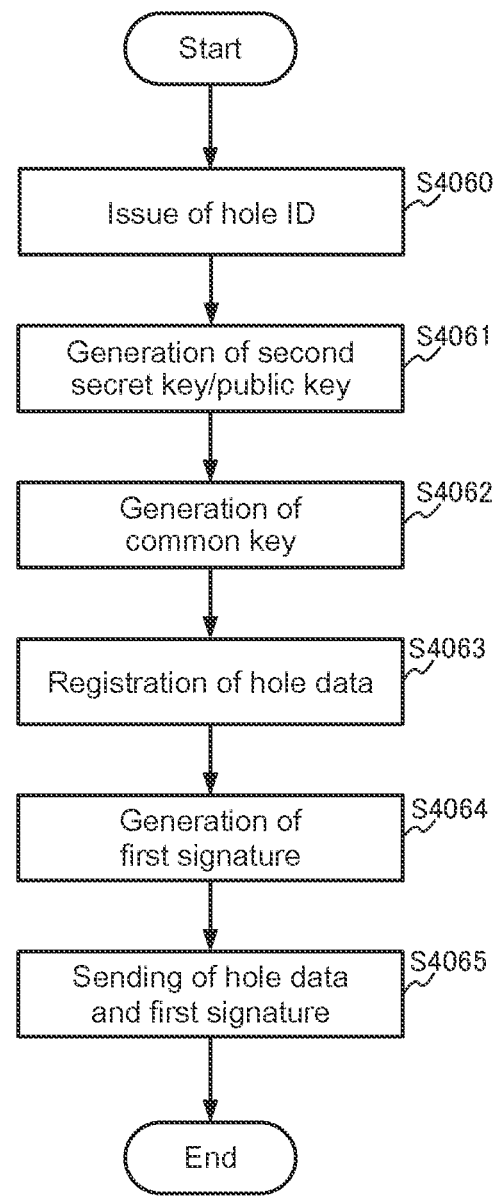

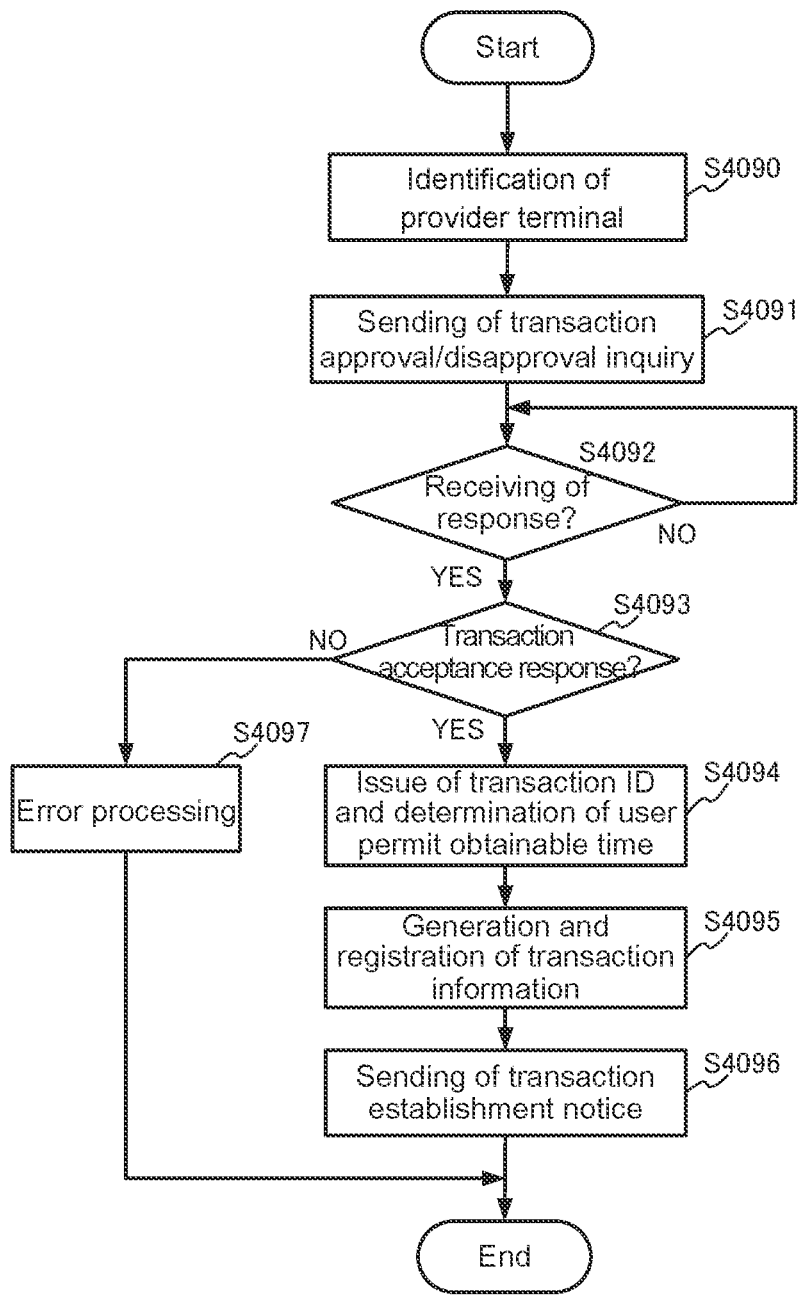

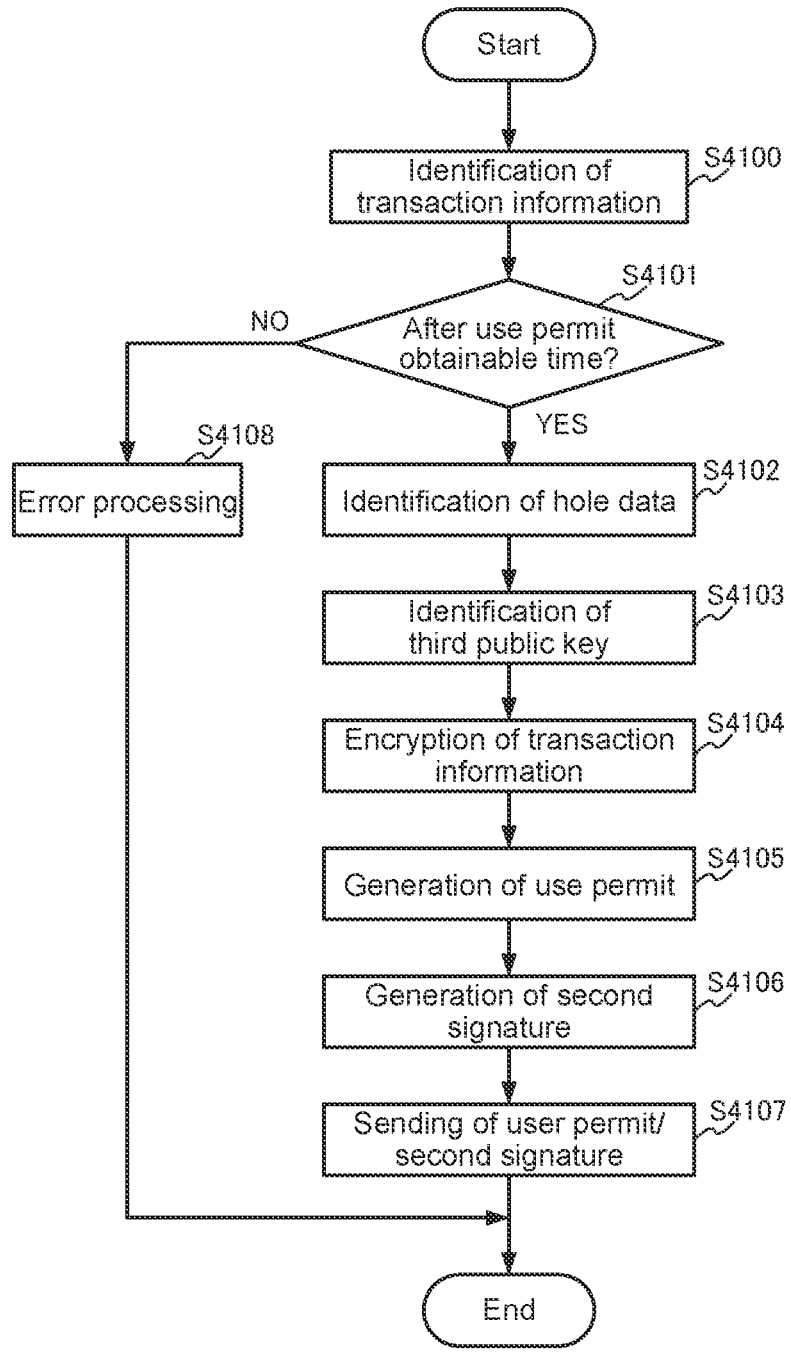

UTILIZATION MANAGEMENT SYSTEM, MANAGEMENT DEVICE, UTILIZATION CONTROL DEVICE, USER TERMINAL, UTILIZATION MANAGEMENT METHOD, AND PROGRAM

This application is the U.S. national phase of International Application No. PCT/JP2020/002638 filed 24 Jan. 2020 which designated the U.S. and claims priority to JP Patent Application No. 2019-155952 filed 28 Aug. 2019, the entire contents of each of which are hereby incorporated by reference.

TECHNICAL FIELD

The present invention relates to a utilization management technique for managing use of a usage target object whose use can be restricted by locking/unlocking, by access control, or by encrypting/decrypting. As such a usage target object, it is possible to mention for example an entrance of a hotel, an inn, a guesthouse, a house, a warehouse, a room, or the like, or a moving body such as an automobile or a bicycle, or a depository, or a browsing terminal for viewing an electronic medium containing for example an electronic medical record or an electronic book.

BACKGROUND ART

The Patent Literature 1 discloses a system in which, by only carrying a room key, one can use various services that includes locking and unlocking of a room in a facility such as a corporate facility, a hospital, a game hall, a public facility, or the like. This system comprises: a room keys each having a readable/writable Radio Frequency Identification (RFID) tag that stores information such as a room number, a password, customer information, or the like; RFID readers that are installed at various places of the facility for reading and writing information from and into the RFID tag of a room key; a database that stores information on rooms and equipment in the facility; and a server that is connected to the RFID readers and the database via a network and performs management of the rooms and the equipment in the facility. For example, an RFID reader installed at a door of a room or in the inside of a room reads information stored in the RFID tag of the room key and sends the information to the server. On receiving the information, the server compares the room number included in the information received from the RFID reader with the room number of the room where the RFID reader is installed, so as to lock and unlock the room in question.

CITATION LIST

Patent Literature

Patent Literature 1: Japanese Unexamined Patent Application Laid-Open No. 2003-132435

SUMMARY OF INVENTION

Technical Problem

The system described in the Patent Literature 1, however, premises that a room key is lent out and returned at a reception desk of a facility such as a corporate facility, a hospital, a game hall, a public facility, or the like. Accordingly, even if a user has reserved the facility over the Internet, the user must stop at the reception desk of the management section that manages the facility, in order to borrow the room key before moving to the reserved facility. Further, after using the facility, the user must stop again at the reception desk of the management section to return the room key. Thus, in the case where the reserved facility is geographically distant from the reception desk of the management section managing the facility, this is inconvenient.

Further, in the system of the Patent Literature 1, the RFID readers installed at various places of the facility read information stored in an RFID tag of a room key, and send the information to the server via the network. Accordingly, for example, in the case where the server is placed outside the facility and the RFID readers installed at various places inside the facility are connected to the server placed outside the facility via the Internet, read information is transmitted over the Internet each time when an RFID reader reads information from the RFID tag of a room key. Thus, the security risk is increased.

The present invention has been made taking the above situation into consideration. An object of the invention is to reduce the security risk while improving the convenience in a utilization management technique for managing use of a usage target object whose use can be restricted by locking/unlocking, by access control, or by encrypting/decrypting, the usage target object including an entrance of a hotel, an inn, a guesthouse, a house, a warehouse, a room, or the like, a moving body such as an automobile or a bicycle, and a browsing terminal for an electronic medium containing an electronic medical record, or an electronic book, or the like.

Solution to Problem

To solve the above problems, the present invention provides a utilization management system, comprising: a utilization control device that controls use of a usage target object by locking/unlocking, access control, or encrypting/decrypting based on a use permit; a management device that manages the usage target object in association with the utilization control device; a provider terminal that sets hole data required for verifying the use permit in the utilization control device; and a user terminal that notifies the use permit to the utilization control device.

Here, the utilization control device can communicate only via Near Field Communication, and is separated from a network. Further, the utilization control device stores a first public key that pairs with a first secret key stored in the management device being associated with the utilization control device itself. When the utilization control device receives the hole data together with a first signature from the provider terminal via the Near Field Communication, the utilization control device verifies the first signature by using the first public key, and sets the hole data in the utilization control device itself when the verification is established. The hole data includes a second public key that pairs with a second secret key stored in the management device being associated with the utilization control device itself.

Further, the user terminal stores a third secret key that pairs with a third public key stored in the management device being associated with the user terminal itself. When the utilization control device receives the use permit together with a second signature from the user terminal via the Near Field Communication, the utilization control device verifies the second signature by using the second public key, and sends a nonce (Number Used Once) to the user terminal before or after this signature verification. Receiving this, the user terminal generates a signature on the nonce by using the third secret key, and sends this signature as a third signature to the utilization control device. Then, the utilization control device verifies the third signature by using the third public key included in the use permit. When the verifications of the second and third signatures are both established, the utilization control device obtains the transaction information included in the use permit, refers to the obtained transaction information, and lifts restriction on use of the usage target object when conditions specified by the transaction information are satisfied.

For example, the present invention provides a utilization management system for managing use of a usage target object, comprising:
  a utilization control device that controls use of the usage target object by locking/unlocking, access control, or encrypting/decrypting based on a use permit;
  a management device that manages the usage target object in association with the utilization control device;
  a provider terminal that sets hole data required for verification of the use permit in the utilization control device; and
  a user terminal that notifies the use permit to the utilization control device, wherein,
  the management device comprises:
  a transaction management means that manages transaction information including conditions on use of the usage target object;
  an object management means that manages a first secret key/first public key in association with the utilization control device;
  a hole management means that manages a second secret key/second public key in association with the utilization control device;
  a user management means that manages a third public key in association with the user terminal;
  a hole data processing means that generates a first signature on the hole data including the second public key managed by the hole management means, by using the first secret key managed by the object management means, to send the hole data and the first signature to the provider terminal; and
  a use permit processing means that generates a second signature on the use permit including the transaction information managed by the transaction management means and the third public key managed by the user management means, by using the second secret key managed by the hole management means, to send the use permit and the second signature to the user terminal,
  the provider terminal sends the hole data and the first signature received from the management device to the utilization control device via Near Field Communication,
  the user terminal comprises:
  a secret key storage means that stores a third secret key that pairs with the third public key being associated with the user terminal itself stored in the user management means of the management device;
  a use permit sending means that sends the use permit and the second signature received from the management device to the utilization control device via the Near Field Communication; and
  a nonce processing means that generates a third signature on a nonce received from the utilization control device, by using the third secret key stored in the secret key storage means, to send the third signature to the utilization control device via the Near Field Communication; and
  the utilization control device communicates only via the Near Field Communication; and comprises:
  a hole setting means that verifies the first signature received together with the hole data from the provider terminal by using pre-registered the first public key, and sets the hole data in the utilization control device itself when the verification being established;
  a signature obtaining means that sends the nonce to the user terminal to obtain the third signature from the user terminal when the use permit and the second signature being received from the user terminal;
  a transaction information obtaining means that verifies the second signature received together with the use permit from the user terminal, by using the second public key included in the hole data set in the utilization control device itself, and verifies the third signature obtained by the signature obtaining means, by using the third public key included in the use permit, to obtain the transaction information included in the use permit when the verifications of the second and third signatures being established; and
  a lifting means that lifts restriction on use of the usage target object with referring to the transaction information obtained by the transaction information obtaining means when the conditions specified by the transaction information being satisfied.

Advantageous Effects of Invention

In the present embodiment, the utilization control device can communicate only via Near Field Communication, and is separated from a network. Accordingly, the utilization control device cannot be attacked from the outside via a network such as the Internet. Further, the use permit used for lifting restriction on use of the usage target object is validated by verifying the second signature added to the use permit, by using the second public key included in the hole data. Further, the hole data is validated by verifying the first signature added to the hole data, by using a first public key. Further, the user terminal is validated as a recipient of the use permit when the user terminal generates the third signature on the nonce obtained from the utilization control device, by using the third secret key, and the utilization control device verifies the third signature obtained from the user terminal, by using the third public key included in the use permit. Thus, according to the present invention, the security risk is reduced.

Further, according to the present invention, restriction on use of the usage target object is lifted only when conditions specified in transaction information included in a use permit are satisfied. On the other hand, when the conditions are not satisfied, the restriction on use of the usage target object is not lifted. Accordingly, by making the transaction information include conditions such as a usable period in which the usage target object can be used, the number of times of use, and the like, the use permit that does not satisfy these conditions becomes invalid even though it has been authenticated. As a result, it is not necessary for the user of the usage target object (i.e., the user of the user terminal) to return the use permit. Thus, according to the present invention, convenience is improved.

Thus, according to the present invention, it is possible to reduce security risks while improving convenience in the utilization management technique that can restrict using of the usage target object by locking/unlocking, access control, or encrypting/decrypting.

BRIEF DESCRIPTION OF DRAWINGS

FIG. 12 is a diagram showing schematically an example of contents registered in a user information storage part 221;

FIG. 13 is a diagram showing schematically an example of contents registered in a provider information storage part 222;

FIG. 14 is a diagram showing schematically an example of contents registered in an object data storage part 223;

FIG. 15 is a diagram showing schematically an example of contents registered in a hole data storage part 224;

FIG. 16 is a diagram showing schematically an example of contents registered in a transaction information storage part 225;

FIG. 19 is a flowchart for explaining the hole generation request processing S406 shown in FIG. 17;

FIG. 20 is a flowchart for explaining the transaction request processing S409 shown in FIG. 17; and FIG. 21 is a flowchart for explaining the use permit request processing S410 shown in FIG. 17.

DESCRIPTION OF EMBODIMENTS

Figure 1:
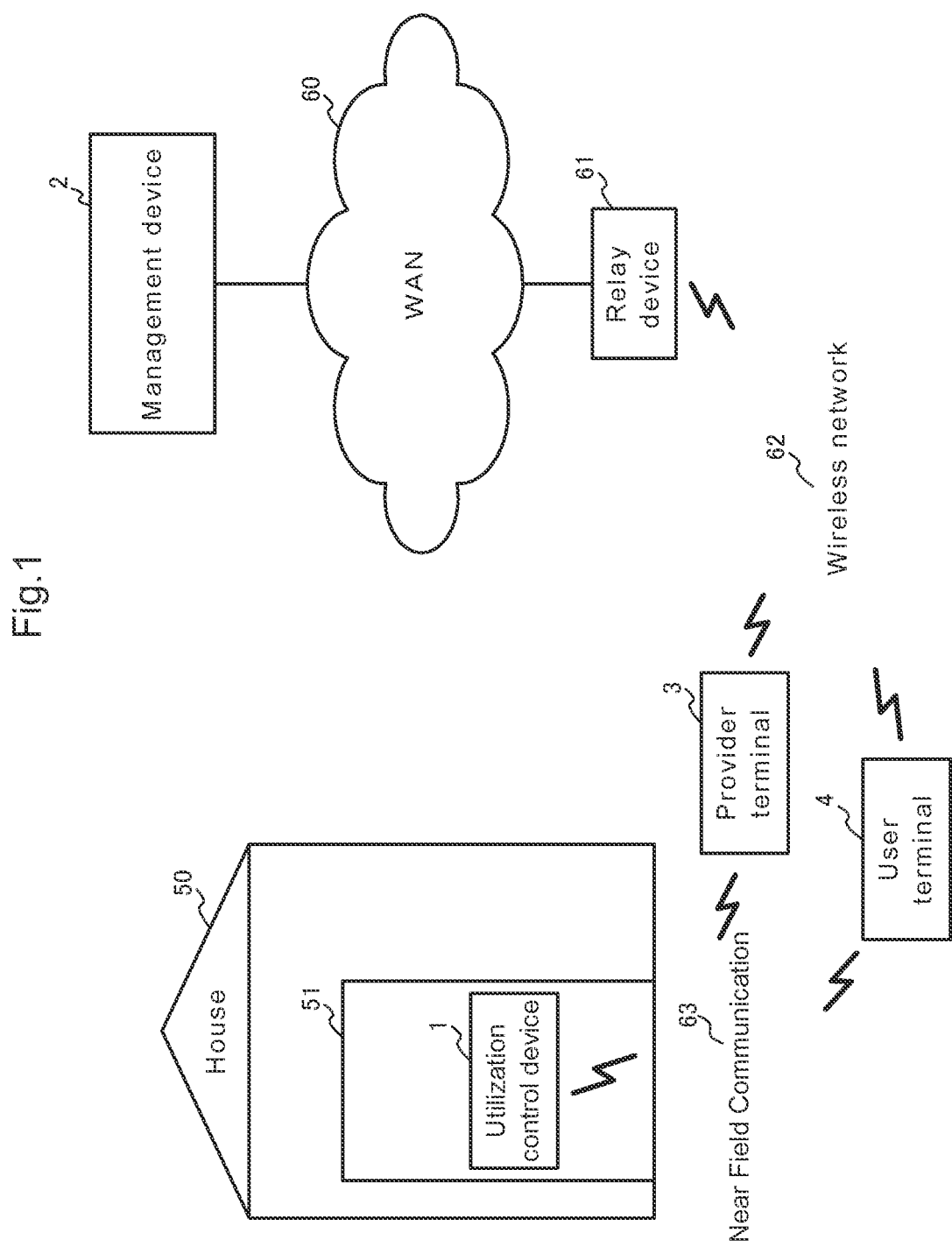
FIG. 1 is a schematic configuration diagram showing a utilization management system according to one embodiment of the present invention.

In the following, one embodiment of the present invention will be described referring to the drawings.

FIG. 1 is a schematic configuration diagram showing a utilization management system according to the present embodiment.

As shown in the figure, the utilization management system of the present embodiment comprises a utilization control device 1, a management device 2, a provider terminal 3, and a user terminal 4.

The utilization control device 1 is provided for each usage target object, can communicate only via Near Field Communication 63 such as IrDA (Infrared Data Association), Bluetooth (registered trademark), or the like, and controls use of the usage target object, by locking/unlocking, access control, or encrypting/decrypting based on a use permit. Here, it is assumed that the usage target object is a house 50, and use of the house 50 is controlled by locking and unlocking of an entrance 51 of the house 50. The management device 2 manages the utilization control device 1. Further, the management device 2 sends hole data that is used for verification of a use permit, to the provider terminal 3 via Wide Area Network (WAN) 60, and sends the use permit to a user terminal 4. The provider terminal 3 is provided for each provider and connected to the WAN 60 via a wireless network 62 and a relay device 61 such as a wireless base station or an access point, and receives hole data from the management device 2. Further, the provider terminal 3 sends the hole data received from the management device 2 to the utilization control device 1 via the Near Field Communication 63. The user terminal 4 is provided for each user and connected to the WAN 60 via the wireless network 62 and the relay device 61, and receives the use permit from the management device 2. Further, the user terminal 4 sends the use permit received from the management device 2 to the utilization control device 1 via the Near Field Communication 63.

Figure 2:
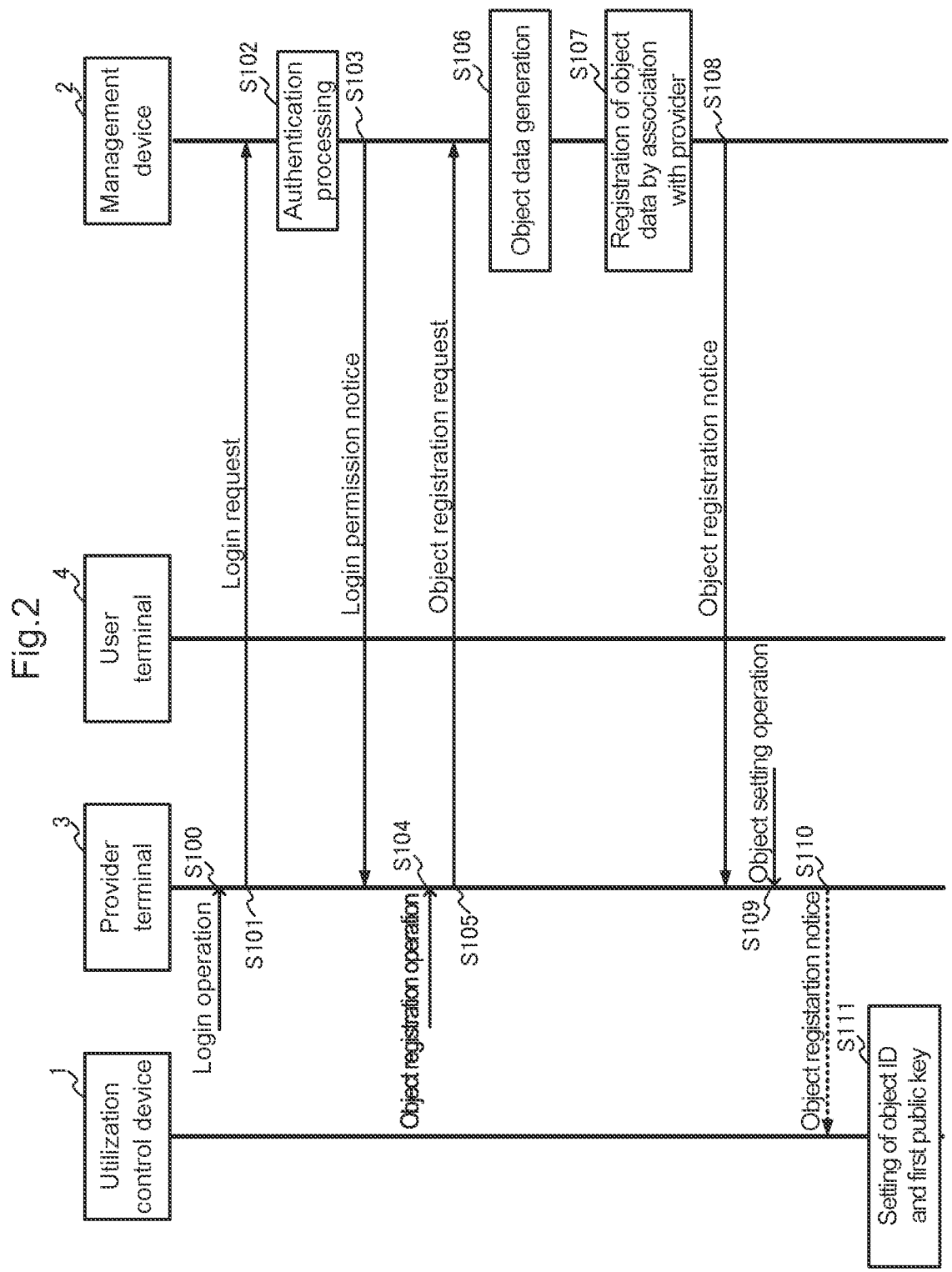
FIG. 2 is a sequence diagram showing an example of an object registration operation for registering a utilization control device 1 in a management device 2 in the utilization management system of the one embodiment of the present invention.

FIG. 2 is a sequence diagram showing an example of an object registration operation for registering the utilization control device 1 in the management device 2 in the utilization management system of the present embodiment.

First, when the provider terminal 3 receives a login operation from the provider who provides the service for using the usage target object (house 50) (S100), the provider terminal 3 sends a login request accompanied by login information that includes provider's user ID and password to the management device (S101). Receiving the login request, the management device 2 performs authentication processing by using the password included in the login request and the password that is managed by association with the user ID included in the login request (S102). When the authentication is established, the management device 2 permits login of the provider terminal 3, i.e., the sender of the login request, and sends a login permission notice to the provider terminal 3 (S103).

Next, when the provider terminal 3 receives from the provider an object registration request operation accompanied by the facility information that includes the facility name, the address, and the like of the house 50 as the usage target object (S104), the provider terminal 3 sends an object registration request including the facility information of the house 50 to the management device 2 (S105). Receiving the object registration request, the management device 2 issues an object ID to be given to the utilization control device that is used for controlling use of the house 50 (controlling of locking/unlocking of the entrance 51), and generates a first secret key/first public key according to the public key cryptosystem. Then, the management device 2 generates object data that includes the object ID, the first secret key/first public key, and the facility information included in the object registration request (S106). Then, the management device 2 registers and manages the generated object data by association with the provider's user ID (S107). Thereafter, the management device 2 sends an object registration notice that includes the object ID and the first public key to the provider terminal 3 (S108).

When the provider terminal 3 receives an object setting operation from the provider in a state that the provider terminal 3 is close to the utilization control device 1 so as to be in a distance allowing the Near Field Communication 63 with the utilization control device 1 (S109), the provider terminal 3 sends the object registration notice received from the management device 2 to the utilization control device 1 via the Near Field Communication 63 (S110). Receiving the object registration notice, the utilization control device 1 sets the object ID and the first public key included in the object registration notice in the utilization control device itself (S111).

Figure 3:
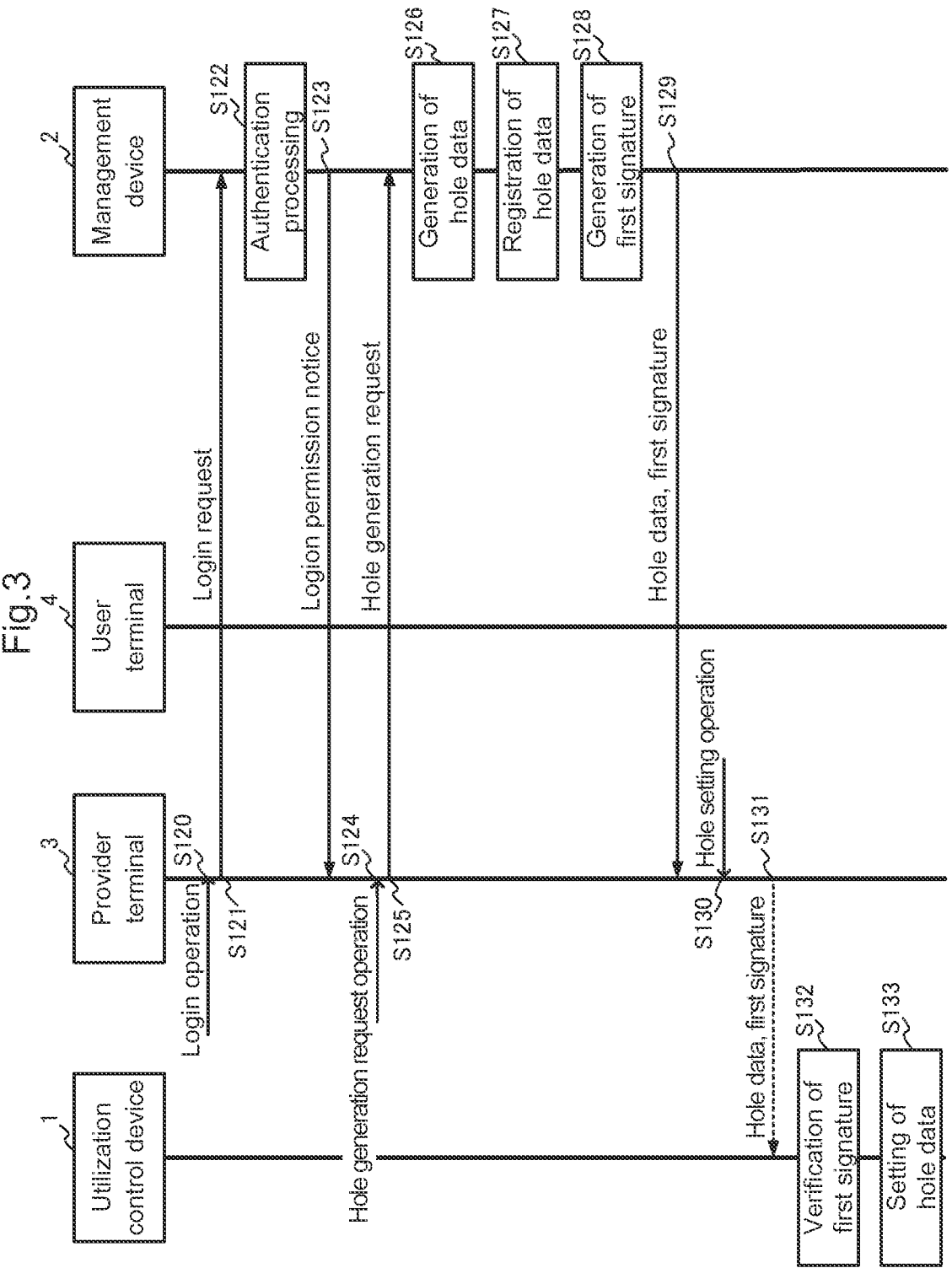
FIG. 3 is a sequence diagram showing an example of a hole setting operation for setting hole data in the utilization control device 1 in the utilization management system of the one embodiment of the present invention.

FIG. 3 is a sequence diagram showing an example of a hole setting operation for setting hole data in the utilization control device 1 in the utilization management system of the present embodiment.

First, when the provider terminal 3 receives a login operation from the provider who provides the service for using the usage target object (house 50) (S120), the provider terminal 3 sends a login request accompanied by login information that includes the provider's user ID and password to the management device (S121). Receiving the login request, the management device 2 performs authentication processing by using the password included in the login request and the password managed by association with the user ID included in the login request (S122). When the authentication is established, the management device 2 permits login of the provider terminal 3, i.e., the sender of the login request, and sends a login permission notice to the provider terminal 3 (S123).

When the provider terminal 3 receives a hole generation request operation accompanied by designation of the object ID of the utilization control device 1 from the provider (S124), the provider terminal sends a hole generation request that includes the object ID to the management device 2 (S125). Receiving the hole generation request, the management device 2 generates a common key according to the common key cryptosystem, and generates a second secret key/second public key according to the public key cryptosystem. Then, the management device 2 generates hole data that includes the object ID, the common key, and the second public key (S126). Then, the management device 2 registers and manages the hole data together with the second secret key (S127). Further, the management device 2 identifies the object data that includes the object ID designated in the hole generation request operation among the object data that the management device 2 itself manages, and generates a first signature on the hole data by using the first secret key included in the identified object data (S128). Thereafter, the management device 2 sends the generated hole data and the first signature to the provider terminal 3 (S129).

Next, when the provider terminal 3 receives a hole setting operation from the provider in a state that the provider terminal 3 is close to the utilization control device 1 so as to be in a distance allowing the Near Field Communication with the utilization control device (S130), the provider terminal 3 sends the hole data and the first signature received from the management device 2 to the utilization control device 1 via the Near Field Communication 63 (S131). Receiving the hole data and the first signature, the utilization control device 1 verifies the first signature received from the provider terminal 3 by using the hole data received from the provider terminal 3 and the first public key set in the utilization control device 1 itself (S132). When the signature verification is established, the utilization control device 1 sets the hole data in the utilization control device 1 itself (S133).

Figure 4:
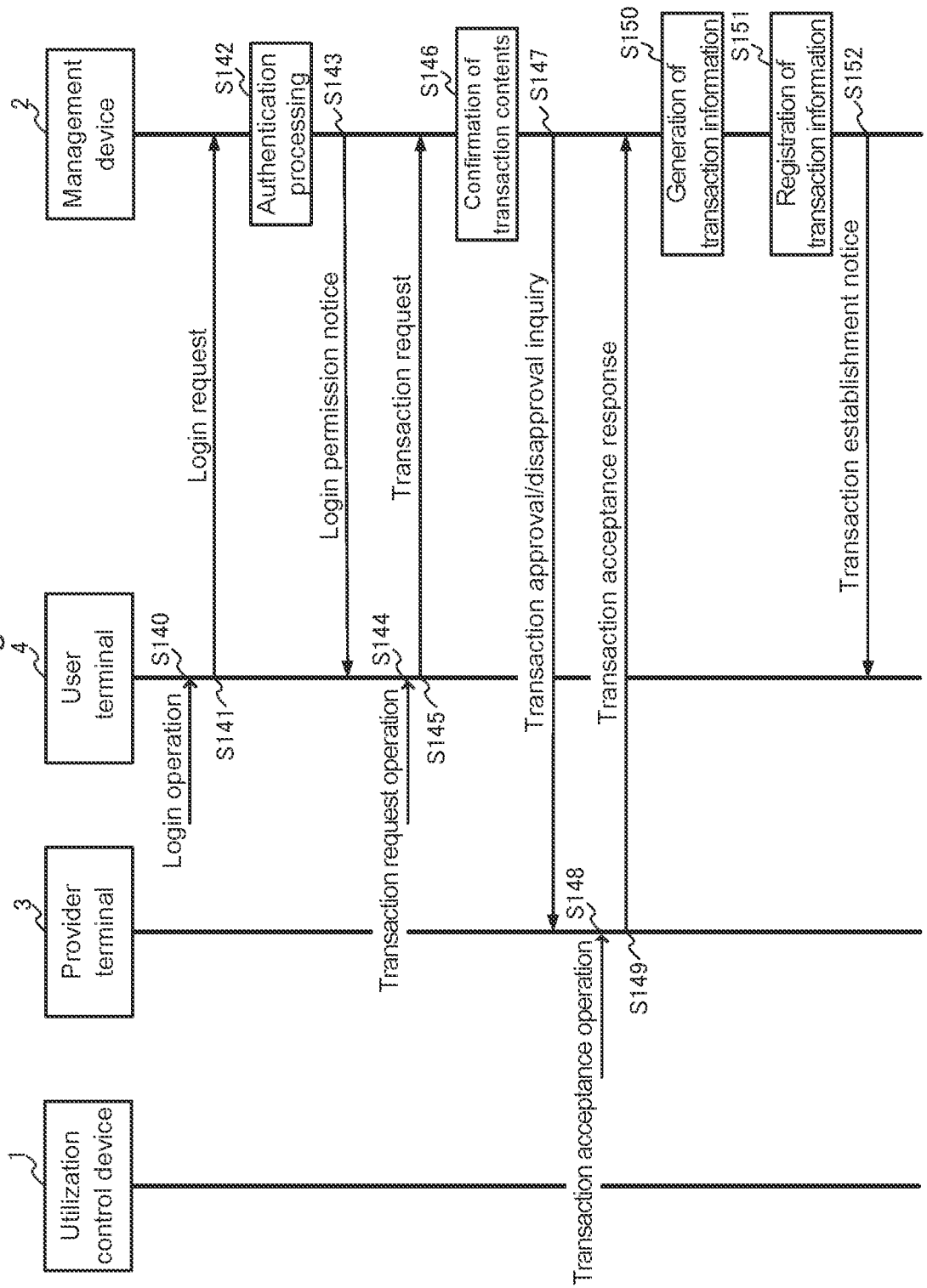
FIG. 4 is a sequence diagram showing an example of a transaction information registration operation for registering transaction information that includes conditions for using a usage target object in the utilization management system of the one embodiment of the present invention.

FIG. 4 is a sequence diagram showing an example of a transaction information registration operation for registering transaction information that includes conditions for using the usage target object (house 50) in the utilization management system of the present embodiment.

First, when the user terminal 4 receives a login operation from the user who is to enjoy the service for using the usage target object (house 50) (S140), the user terminal 4 sends a login request accompanied by login information that includes the user's user ID and password to the management device 2 (S141). Receiving the login request, the management device 2 performs authentication processing by using the password included in the login request and the password managed by association with the user ID included in the login request (S142). When the authentication is established, the management device 2 permits login of the user terminal 4, i.e., the sender of the login request, and sends a login permission notice to the user terminal 4 (S143).

Next, when the user terminal 4 receives from the user a transaction request operation accompanied by designation of the user ID of the provider who provides the service for using the usage target object (house 50) that the user desired to use, the object ID of the utilization control device 1 installed at the usage target object, and desire information on use of the usage target object such as desired start and end times of use, the number of times of use, or the like (S144), the user terminal 4 sends to the management device 2 a transaction request that includes these designated information (the provider's user ID, the object ID, and the desire information on use of the usage target object) (S145).

Receiving the transaction request, the management device 2 confirms the transaction contents based on the information included in the transaction request (S146). In detail, the management device 2 confirms that the object data having the object ID included in the transaction request exists among the object data managed by association with the provider's user ID included in the transaction request, in order to confirm that the service desired by the user can be provided. Then, the management device 2 generates a transaction approval/disapproval inquiry that includes the object ID and the desire information on use of the usage target object included in the transaction request, and sends the transaction approval/disapproval inquiry to the provider terminal 3 that is identified by the address information managed by association with the provider's user ID included in the transaction request (S147).

When the provider terminal 3 receives the transaction approval/disapproval inquiry from the management device 2, the provider terminal 3 displays the object ID and the desire information on use of the usage target object included in the transaction approval/disapproval inquiry, in order to confirm approval/disapproval of the transaction by the provider. When the provider terminal 3 receives a transaction acceptance operation to the effect that the provider approves the transaction (i.e., the provider will provide the user with the service for using the usage target object whose use is restricted by the utilization control device 1 identified by the object ID) from the provider (S148), the provider terminal 3 sends a transaction acceptance response as a reply to the transaction approval/disapproval inquiry to the management device 2 (S149).

Receiving the transaction approval response, the management device 2 determined that the transaction has been established, and issues a transaction ID, and generates transaction information that includes the transaction ID, the user's user ID, the information included in the transaction request (i.e., the provider's user ID, the object ID, and the desire information on use of the usage target object), and a use permit obtainable time (for example, the time 24 hours before the desired start time of use) determined based on the desired start time of use included in the desire information on use of the usage target object (S150). Next, the management device 2 registers and manages the generated transaction information (S151). Then, the management device 2 sends a transaction establishment notice that includes the transaction information to the user terminal 4 (S152), and makes the transaction information displayed on the user terminal 4.

Figure 5:
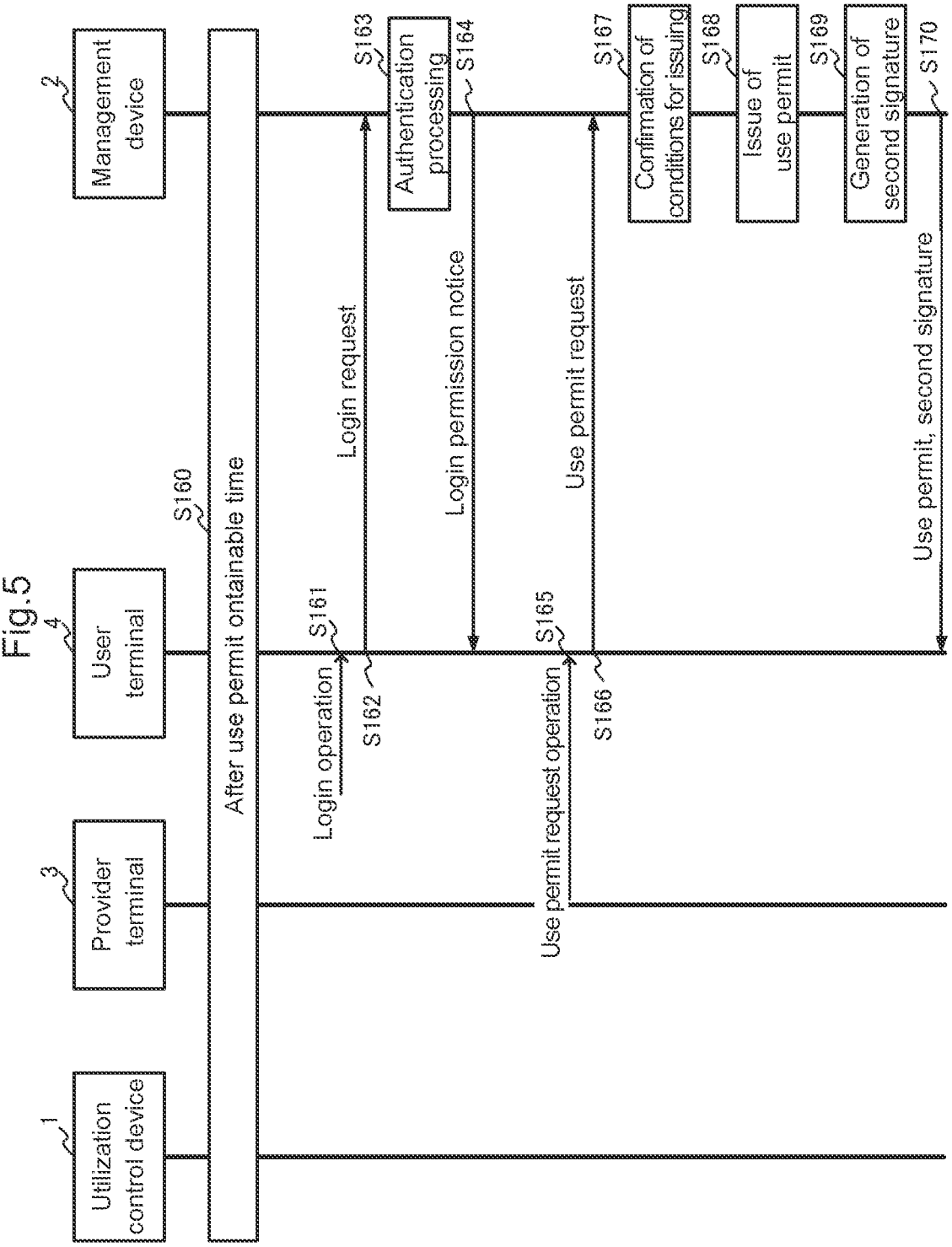
FIG. 5 is a sequence diagram showing an example of a use permit issue operation for the management device 2 to issue a use permit to a user terminal 4 in the utilization management system of the one embodiment of the present invention.

FIG. 5 is a sequence diagram showing an example of a use permit issue operation for the management device 2 to issue a use permit to the user terminal 4 in the utilization management system of the present embodiment.

It is assumed that it is after the use permit obtainable time in the transaction information included in the transaction establishment notice received by the user terminal 4 from the management device 2 (S160).

When the user terminal 4 receives a login operation from the user who recognizes that it is after the use permit obtainable time (S161), the user terminal 4 sends a login request accompanied by login information that includes the user's user ID and password to the management device 2 (S162). Receiving the login request, the management device 2 performs authentication processing by using the password included in the login request and the password managed by association with the user ID included in the login request (S163). Then, when the authentication is established, the management device 2 permits login of the user terminal 4, i.e., the sender of the login request, and sends a login permission notice to the user terminal 4 (S164).

Next, when the user terminal 4 receives from the user a use permit request operation accompanied by designation of the transaction ID included in the transaction information (S165), the user terminal 4 sends a use permit request that includes the transaction ID to the management device 2 (S166).

Receiving the use permit request, the management device 2 identifies the transaction information that has the transaction ID included in the use permit request among the transaction information that the management device 2 manages, and confirms that conditions for issuing a use permit are satisfied, based on the identified transaction information (S167). In detail, the management device confirms that the user ID of the user of the user terminal 4 coincides with the user's user ID included in the transaction information and that the use permit obtainable time included in the transaction information has been past.

Then, the management device 2 identifies user information associated with the user's user ID among user information that the management device 2 manages, and identifies hole data that has the object ID included in the transaction information among the hole data that the management device 2 manages. Then, the management device 2 encrypts the transaction information by using the common key in the identified hole data, and issues a use permit that includes the encrypted transaction information and a third public key included in the identified user information (a public key that pairs with a third secret key held in secret by the user terminal 4) (S168).

Next, the management device 2 generates a second signature on the use permit by using the second secret key managed by association with the identified hole data (S169). Thereafter, the management device 2 sends the use permit and the second signature to the user terminal 4 (S170).

Figure 6:
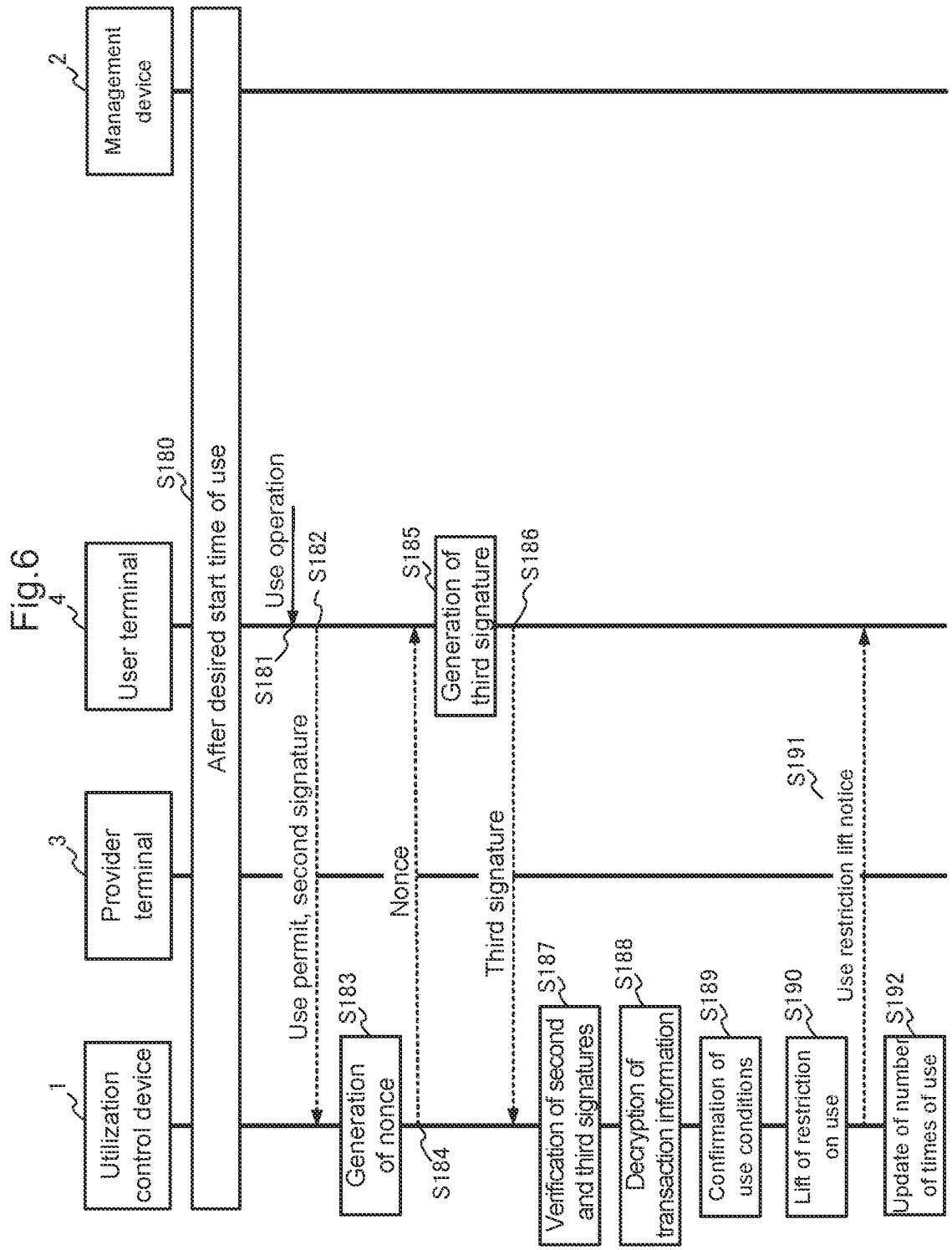
FIG. 6 is a sequence diagram showing an example of a use restriction lift operation for the utilization control device 1 to lift restriction on use of a usage target object in the utilization management system of the one embodiment of the present invention.

FIG. 6 is a sequence diagram showing an example of a use restriction lift operation for the utilization control device 1 to lift restriction on use of the usage target object in the utilization management system of the present embodiment.

It is assumed that it is after the desired start time of use included in the desire information on use of the usage target object, in the transaction information included in the transaction establishment notice received by the user terminal 4 from the management device 2, with respect to the usage target object that the user desires to use (S180).

When the user terminal 4 receives a use operation from the user who recognizes that the present date and time is within the period determined by the desired start and end times of use included in the desire information on use in the transaction information, in a state that the user is close to the utilization control device 1 so as to be in a distance allowing the Near Field Communication 63 with the utilization control device 1 installed at the usage target object (house 50) that the user desires to receive the service (S181), the user terminal 4 sends the use permit and the second signature received from the management device 2 to the utilization control device 1 via the Near Field Communication 63 (S182).

Receiving the use permit and the second signature, the utilization control device 1 generates a nonce (Number Used Once) (S183), and sends the generated nonce to the user terminal 4 via the Near Field Communication 63 (S184). When the user terminal 4 receives the nonce from the utilization control device 1, the user terminal 4 generates a third signature on the nonce by using the third secret key that the user terminal 4 holds in secret (S185), and sends the generated third signature to the utilization control device 1 via the Near Field Communication 63 (S186).

Next, the utilization control device 1 verifies the second signature received from the user terminal 4 by using the use permit received from the user terminal 4 and the second public key included in the hole data set in the utilization control device 1 itself, and verifies the third signature received from the user terminal 4 by using the nonce sent to the user terminal 4 and the third public key included in the use permit (S187). Then, when the verifications of the second and third signatures are both established, the utilization control device 1 decrypts the encrypted transaction information included in the use permit by using the common key included in the hole data (S188).

Next, the utilization control device 1 confirms satisfaction of the conditions specified in the desire information on use of the usage target object that is included in the decrypted transaction information (S189). In detail, the utilization control device 1 confirms that the present date and time is within the period determined by the desired start and end times of use included in the desire information on use of the usage target object. Further, the utilization control device 1 confirms that the number of times of use managed by association with the transaction ID of the transaction information is less than the number of times of use included in the desire information on use of the usage target object. When it is confirmed that the conditions specified in the desire information on use of the usage target object are satisfied, the utilization control device 1 lifts the restriction on use of the usage target object (S190). Here, the utilization control device 1 unlocks an automatic lock of the entrance 51 of the house 50 as the usage target object.

Thereafter, the utilization control device 1 sends a use restriction lift notice to the user terminal 4 via the Near Field Communication 63 (S191). Then, the utilization control device 1 increments by one the number of times of use managed by association with the transaction ID of the transaction information (S192). Here, if the number of times of use has not been managed by association with the transaction ID of the transaction information, the utilization control device 1 sets the number of times of use to "1" and manages the number of times of use by association with the transaction ID of the transaction information.

Next, the utilization control device 1, the user terminal 4, and the management device 2 as the components of the utilization management system of the present embodiment will be described in detail. On the other hand, an existing network terminal having the Near Field Communication function, such as a smartphone, a tablet Personal Computer (PC), or the like, can be used as the provider terminal 3, and thus detailed description of the provider terminal 3 is omitted.

First, the utilization control device 1 will be described in detail.

Figure 7:
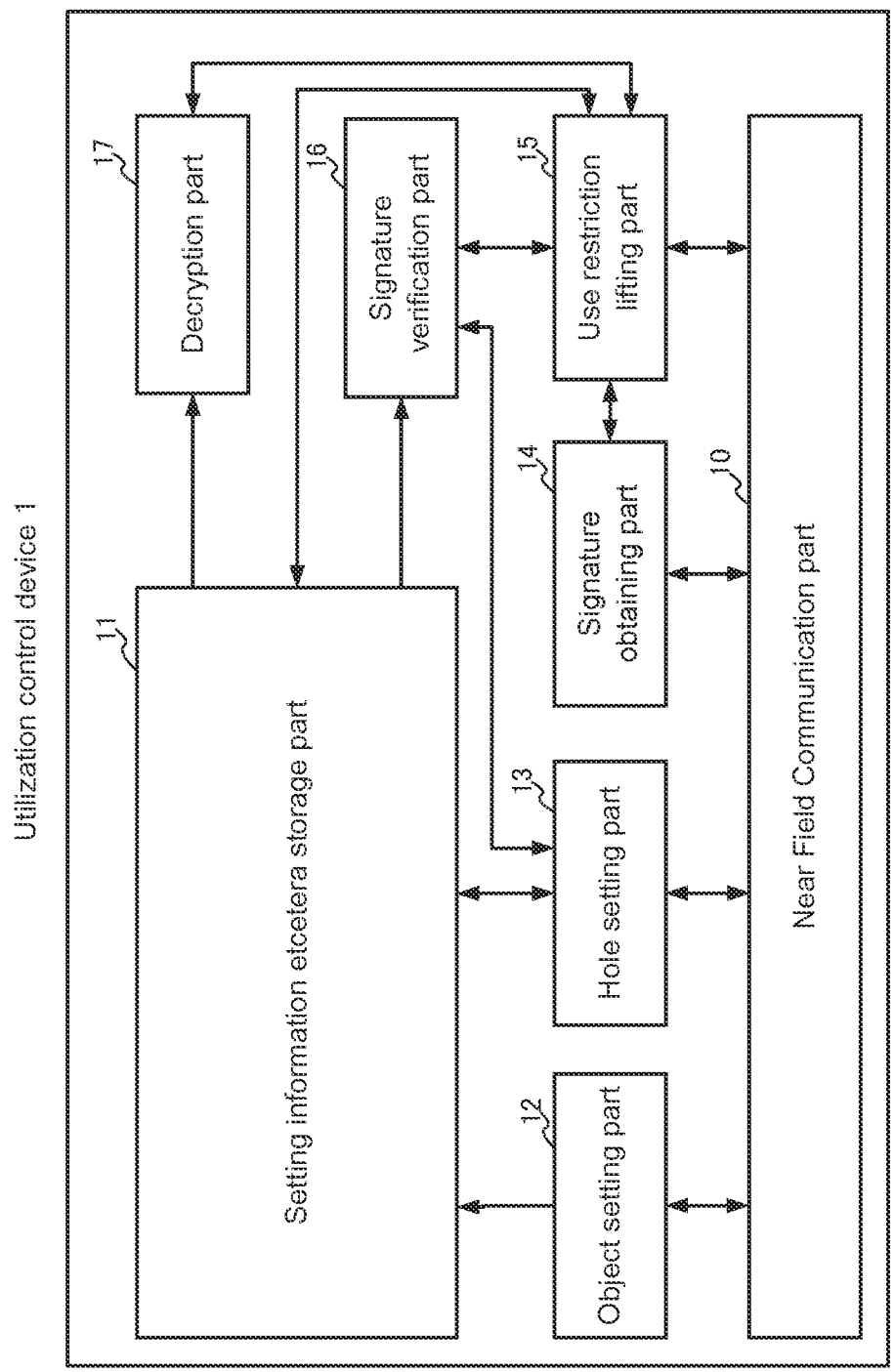
FIG. 7 is a schematic functional configuration diagram of the utilization control device 1.

FIG. 7 is a schematic functional configuration diagram of the utilization control device 1.

As shown in the figure, the utilization control device comprises a Near Field Communication part 10, a setting information et cetera storage part 11, an object setting part 12, a hole setting part 13, a signature obtaining part 14, a use restriction lifting part 15, a signature verification part 16, and a decryption part 17.

The Near Field Communication part 10 communicates with the provider terminal 3 and the user terminal 4 via the Near Field Communication 63 such as IrDA, Bluetooth (registered trademark), or the like.

The setting information et cetera storage part 11 stores setting information such as an object ID, the first public key, the hole data, and the like. Further, the setting information et cetera storage part 11 stores determination information that is used for determining whether the conditions, such as the number of times of use, for using the usage target object are satisfied.

The object setting part 12 stores, as setting information, the object ID and the first public key obtained from the provider terminal 3 into the setting information et cetera storage part 11.

The hole setting part 13 stores the hole data as setting information into the setting information et cetera storage part 11 when verification of the first signature obtained together with hole data from the provider terminal 3 is established.

The signature obtaining part 14 sends the nonce to the user terminal 4 according to an instruction from the use restriction lifting part 15, and obtains the third signature on the nonce from the user terminal 4.

The use restriction lifting part 15 lifts restriction on use of the usage target object, when verification of the second signature obtained together with the use permit from the user terminal 4 is established, verification of the third signature obtained by the signature obtaining part 14 from the user terminal 4 is established, and the conditions specified in the desire information on use of the usage target object that is included in the transaction information of the use permit are satisfied. In the present embodiment, the use restriction lifting part 15 outputs an unlocking instruction to the automatic lock of the entrance 51 of the house 50. Further, the use restriction lifting part 15 registers/updates the determination information such as the number of times of use into/in the setting information et cetera storage part 11.

The signature verification part 16 verifies the first signature on the hole data by using the first public key stored in the setting information et cetera storage part 11, according to an instruction from the hole setting part 13. Further, the signature verification part 16 verifies the second signature on the use permit by using the second public key included in the hole data stored in the setting information et cetera storage part 11, and verifies the third signature on the nonce by using the third public key included in the use permit, according to an instruction from the use restriction lifting part 15.

The decryption part 17 decrypts the encrypted transaction information included in the use permit by using the common key included in hole data stored in the setting information et cetera storage part 11, according to an instruction from the use restriction lifting part 15.

Here, the schematic functional configuration of the utilization control device 1 shown in FIG. 7 may be implemented by hardware, for example by using an integrated logic IC such as an Application Specific Integrated Circuit (ASIC), a Field Programmable Gate Array (FPGA), or the like, or may be implemented by software on a computer device such as a Digital Signal Processor (DSP), or the like. Or in a general-purpose computer comprising a CPU, a memory, an auxiliary storage such as a flash memory or a hard disk drive, and a Near Field Communication device such as an IrDA communication device, a Bluetooth (registered trademark) communication device, or the like, the schematic functional configuration may be implemented by the CPU loading a prescribed program from the auxiliary storage into the memory and executes the program.

Figure 8:
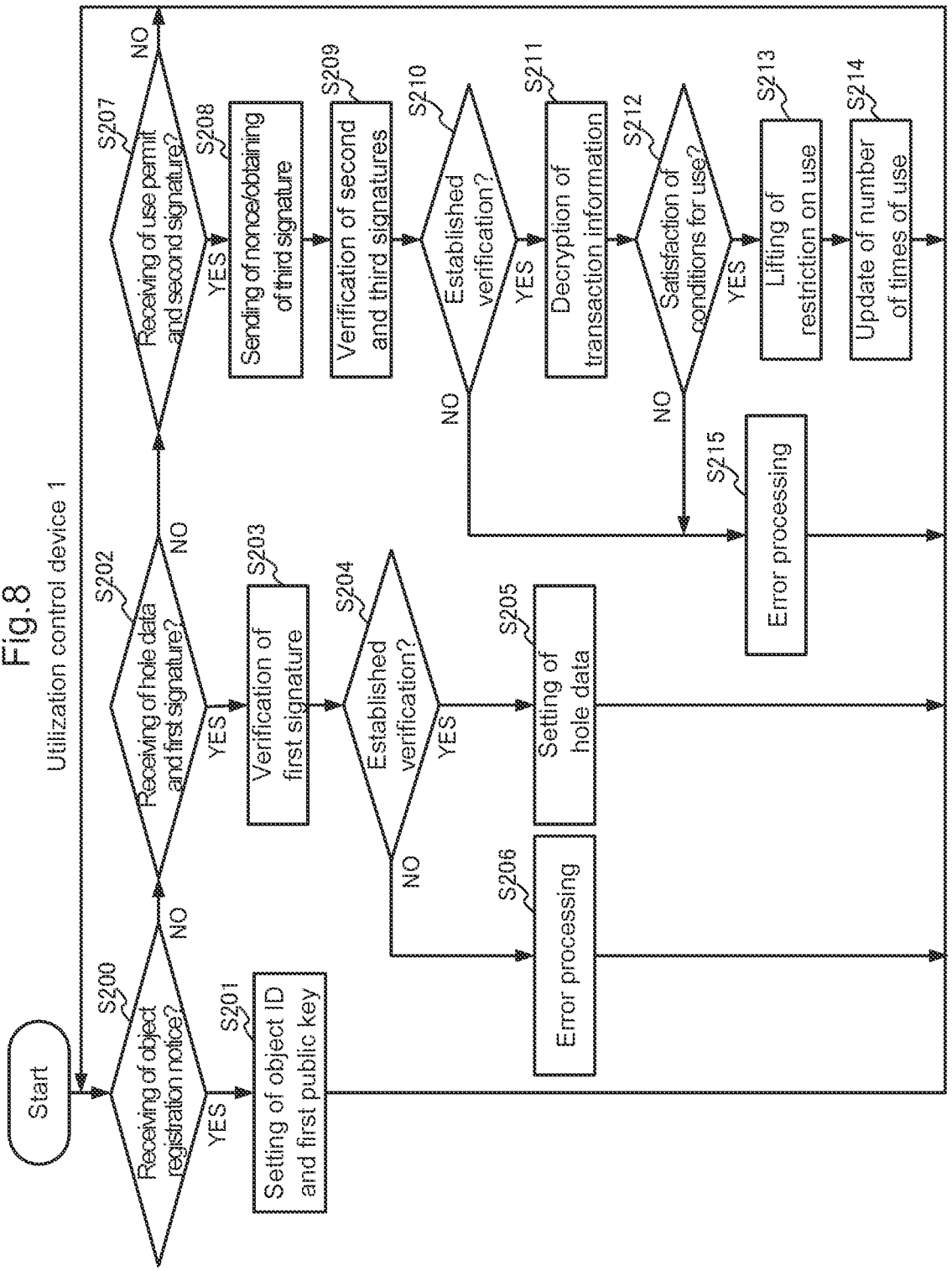
FIG. 8 is a flowchart for explaining operation of the utilization control device 1.

FIG. 8 is a flowchart for explaining operation of the utilization control device 1.

When the object setting part 12 receives an object registration notice from the provider terminal 3 via the Near Field Communication part 10 (YES in S200), the object setting part 12 stores, as setting information, the object ID and the first public key included in the object registration notice into the setting information et cetera storage part 11 (S201).

Further, when the hole setting part 13 receives the hole data and the first signature from the provider terminal 3 via the Near Field Communication part 10 (YES in S202), the hole setting part 13 delivers the hole data and the first signature to the signature verification part 16 in order to request verification of the first signature. Receiving the request, the signature verification part 16 verifies the first signature on the hole data by using the first public key stored in the setting information et cetera storage part 11 (S203). In detail, the signature verification part 16 verifies the validity of the first signature by decrypting the first signature by using the first public key, and by determining whether the decrypted information coincides with the hole data or the message digest (hash value) of the hole data. Then, the signature verification part 16 notifies the first signature's verification result to the hole setting part 13.

Receiving the verification result, when the verification of the first signature is established to validate the first signature (YES in S204), the hole setting part 13 stores the hole data, as setting information, in the setting information et cetera storage part 11 (S205). On the other hand, the verification of the first signature is not established and fails to validate the first signature (NO in S204), the hole setting part 13 performs predetermined error processing such as sending of an error message to the provider terminal 3 via the Near Field Communication part 10 (S206).

Further, when the use restriction lifting part 15 receives the use permit and the second signature from the user terminal 4 via the Near Field Communication part 10 (YES in S207), the use restriction lifting part 15 instructs the signature obtaining part 14 to obtain the third signature. Receiving the instruction, the signature obtaining part 14 generates the nonce and sends the nonce to the user terminal 4 via the Near Field Communication part 10. Then, the signature obtaining part 14 obtains the third signature on the nonce via the Near Field Communication part 10, and delivers the third signature together with the nonce to the use restriction lifting part 15 (S208).

Next, the use restriction lifting part 15 delivers the use permit together with the second signature and the nonce together with the third signature to the signature verification part 16, and instructs the signature verification part 16 to verify the second and third signatures. Receiving the instruction, the signature verification part 16 verifies the second signature on the use permit by using the second public key included in the hole data stored in the setting information et cetera storage part 11, and verifies the third signature on the nonce by using the third public key included in the use permit (S209). In detail, the signature verification part 16 verifies the validity of the second signature by decrypting the second signature by using the second public key, and by determining whether the decrypted information coincides with the use permit or the message digest of the use permit. Further, the signature verification part 16 verifies the validity of the third signature by decrypting the third signature by using the third public key, and by determining whether the decrypted information coincides with the nonce or the message digest of the nonce.

Next, the signature verification part 16 notifies the verification result of the second and third signatures to the use restriction lifting part 15.

When the verification of at least one of the second and third signatures is not established and thus fails to validate both the second and third signatures (NO in S210), the use restriction lifting part 15 that has received the verification result, performs predetermined error processing such as sending of an error message to the user terminal 4 via the Near Field Communication part 10 (S215).

On the other hand, when the verification of both the second and third signatures is established to validate both signatures (YES in S210), the use restriction lifting part 15 delivers the encrypted transaction information included in the use permit to the decryption part 17, and instructs the decryption part 17 to decrypt the encrypted transaction information.

Next, when the decryption part 17 receives the instruction of decryption together with the encrypted transaction information from the use restriction lifting part 15, the decryption part 17 decrypts the encrypted transaction information by using the common key included in the hole data stored in the setting information et cetera storage part 11 (S211). Then, the decryption part 17 delivers the decrypted transaction information to the use restriction lifting part 15.

Receiving the decrypted transaction information, the use restriction lifting part 15 determines whether the conditions specified in the desire information on use of the usage target object that is included in the decrypted transaction information are satisfied (S212). In detail, it is determined whether the present date and time is within the period determined by the desired start and end times of use included in the desire information on use of the usage target object. Further, it is determined whether the number of times of use included in the determination information stored in the setting information et cetera storage part 11 being associated with the transaction ID of the transaction information is less than the number of times of use included in the desire information on use of the usage target object. If the number of times of use is not stored in the setting information et cetera storage part being associated with the transaction ID of the transaction information, the number of times of use is determined to be "0".

Next, when the use restriction lifting part 15 determines that the conditions specified by the desire information on use of the usage target object that is included in the transaction information are satisfied (YES in S212), the use restriction lifting part 15 lifts the restriction on use of the usage target object (S213). In the present embodiment, the use restriction lifting part 15 outputs an unlocking instruction to the automatic lock of the entrance 51 of the house 50. Further, the use restriction lifting part 15 updates (increments by one) the number of times of use stored in the setting information et cetera storage part 11 being associated with the transaction ID of the transaction information (S214). Here, if the number of times of use is not registered in the setting information et cetera storage part 11 being associated with the transaction ID of the transaction information, the use restriction lifting part 15 registers "1" as the number of times of use in the setting information et cetera storage part 11 being associated with the transaction ID of the transaction information.

On the other hand, when the use restriction lifting part 15 determines that the conditions specified by the desire information on use of the usage target object that is included in the transaction information are not satisfied (NO in S212), the use restriction lifting part 15 performs predetermined error processing such as sending of an error message to the user terminal 4 via the Near Field Communication part 10 (S215).

Next, the user terminal 4 will be described in detail.

Figure 9:
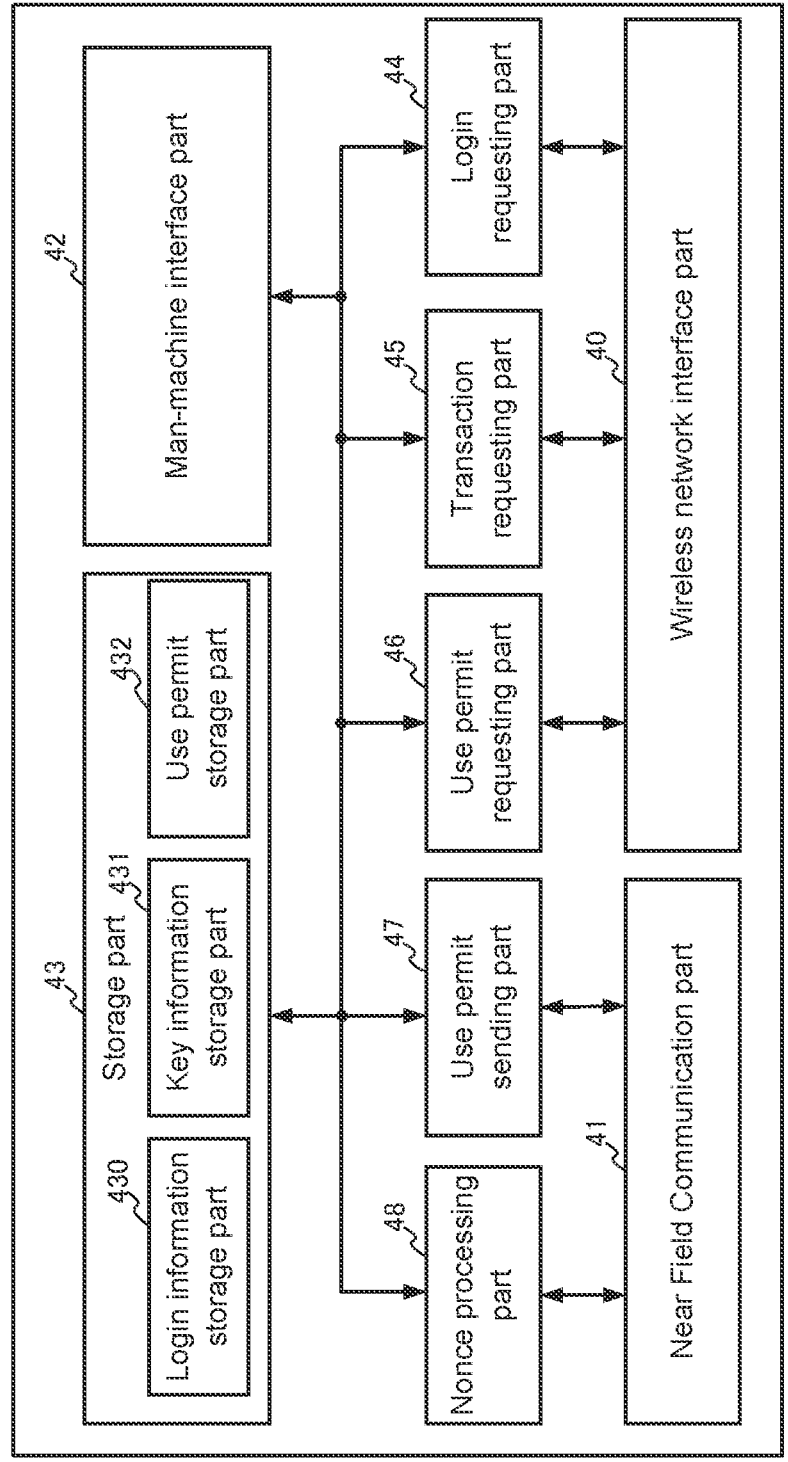
FIG. 9 is a schematic functional configuration diagram of the user terminal 4.

FIG. 9 is a schematic functional configuration diagram of the user terminal 4.

As shown in the figure, the user terminal 4 comprises a wireless network interface part 40, a Near Field Communication part 41, a man-machine interface part 42, a storage part 43, a login requesting part 44, a transaction requesting part 45, a use permit requesting part 46, a use permit sending part 47, and a nonce processing part 48.

The wireless network interface part 40 is an interface for connecting with the WAN 60 via the wireless network 62 and the relay device 61.

The Near Field Communication part 41 communicates with the utilization control device 1 via the Near Field Communication 63 such as IrDA, Bluetooth (registered trademark), or the like.

The man-machine interface part 42 is an interface for presenting information to the user and receiving various operations from the user, and has for example a touch panel display.

The storage part 43 comprises a login information storage part 430, a key information storage part 431, and a use permit storage part 432.

The login information storage part 430 stores login information that includes the user's user ID and password, for the user terminal 4 to log in to the management device 2.

The key information storage part 431 stores the third secret key that is used for generating the third signature on the nonce received from the utilization control device 1.

The use permit storage part 432 stores the use permit and the second signature obtained from the management device 2.

The login requesting part 44 sends the login request that contains the login information stored in the login information storage part 430, to the management device 2, according to the login operation received from the user via the man-machine interface part 42, in order to log in to the management device 2.

The transaction requesting part 45 sends the transaction request to the management device 2 in a state that the user terminal 4 has logged in to the management device 2, according to the transaction request operation received from the user via the man-machine interface part 42. Here, the transaction request contains the provider's user ID, the object ID, and the desire information on use of the usage target object that are received in the transaction request operation from the user. Thereby, the transaction requesting part 45 obtains the transaction information that includes the transaction ID from the management device 2. Then, the transaction requesting part 45 displays the obtained transaction information on the man-machine interface part 42.

The use permit requesting part 46 sends the use permit request to the management device 2 in a state that the user terminal 4 has logged in to the management device 2, according to the use permit request operation received from the user via the man-machine interface part 42. Here, the use permit request contains the transaction ID that is received in the use permit request operation from the user. Thereby, the use permit requesting part 46 obtains the use permit together with the second signature from the management device 2. Then, the use permit requesting part 46 stores the use permit and the second signature in the use permit storage part 432.

The use permit sending part 47 sends the use permit and the second signature stored in the use permit storage part 432 to the utilization control device 1, according to the use operation received from the user via the man-machine interface part 42.

The nonce processing part 48 generates the third signature on the nonce received from the utilization control device 1 by using the third public key stored in the key information storage part 431, and sends the generated third signature to the utilization control device 1.

The schematic functional configuration of the user terminal 4 shown in FIG. 7 may be implemented by hardware, for example by using an integrated logic IC such as an ASIC, an FPGA, or the like, or may be implemented by software on a computer device such as a DSP. Or in a network terminal such as a smartphone, a tablet PC, or the like, comprising a CPU, a memory, an auxiliary storage such as a flash memory, and a Near Field Communication device such as an IrDA communication device, a Bluetooth (registered trademark) communication device, or the like, the schematic functional configuration may be implemented by the CPU loading a prescribed program into the memory from the auxiliary storage and executes the program.

Figure 10:
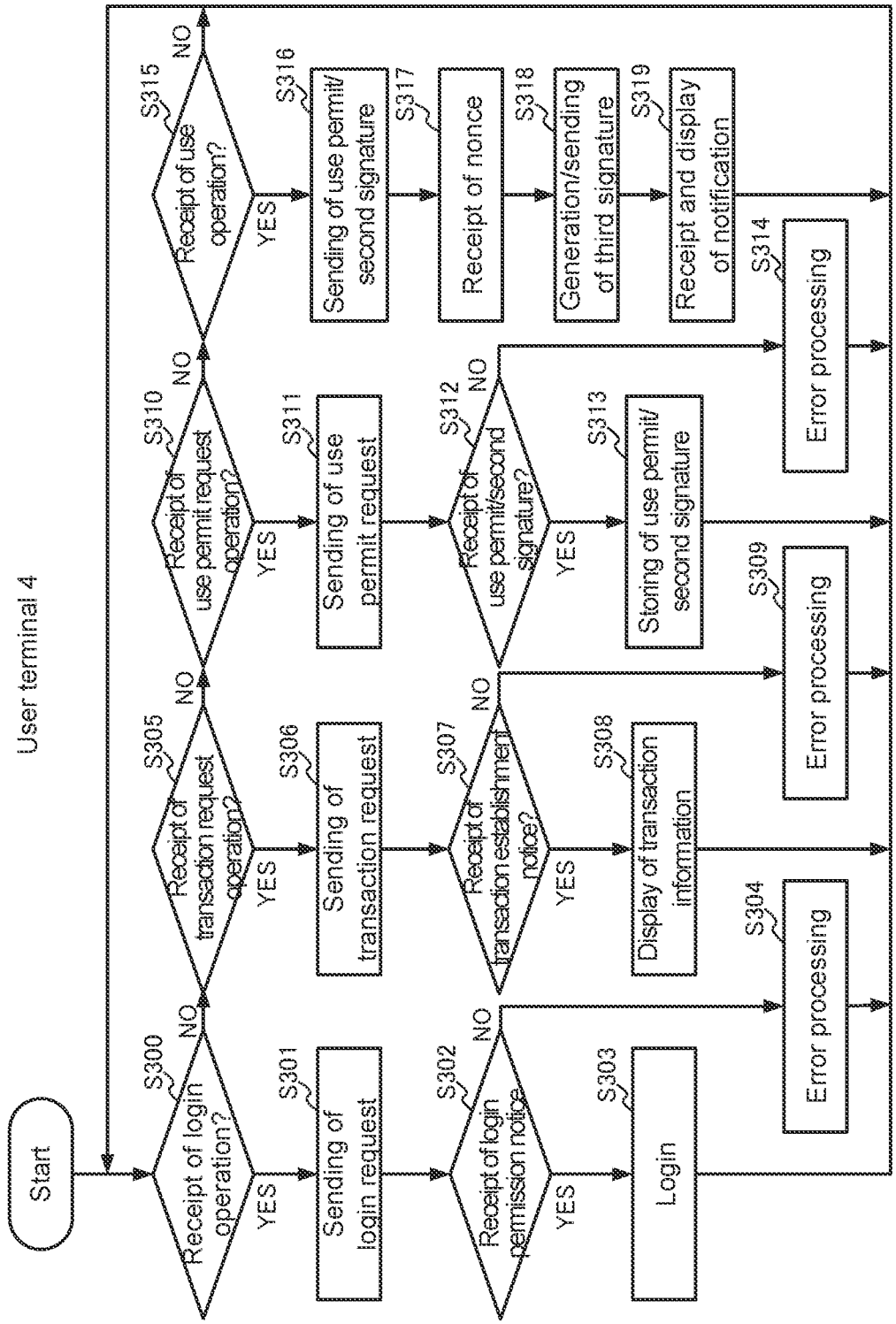
FIG. 10 is a flowchart for explaining operation of the user terminal 4.

FIG. 10 is a flowchart for explaining operation of the user terminal 4.

When the login requesting part 44 receives the login operation from the user via the man-machine interface part 42 (YES in S300), the login requesting part 44 sends the login request that contains the login information stored in the login information storage part 430 to the management device 2 via the wireless network interface part 40 (S301). When the login requesting part 44 receives the login permission notice from the management device 2 (YES in S302), the login requesting part 44 makes its own user terminal 4 log in to the management device 2 (S303). On the other hand, when the login requesting part 44 receives the login rejection notice from the management device 2 (NO in S302), the login requesting part 44 performs predetermined error processing such as outputting of a message to the effect that the login was rejected to the man-machine interface part 42 (S304).

Further, when the transaction requesting part 45 receives the transaction request operation that is accompanied by designation of the user ID of the provider who provides the service for using the usage target object desired to use, the object ID of the utilization control device 1 installed at the usage target object, and the desire information (the desired start and end times of use, the number of times of use, or the like) on use of the usage target object, from the user via the man-machine interface part 42 in a state that its own user terminal 4 has logged in to the management device 2 (YES in S305), the transaction requesting part 45 sends the transaction request that contains the information (the provider's user ID, the object ID, and the desire information on use of the usage target object) designated in the transaction request operation to the management device 2 via the wireless network interface part 40 (S306). When the transaction requesting part 45 receives the transaction establishment notice from the management device 2 (YES in S307), the transaction requesting part 45 displays the transaction information included in the transaction establishment notice on the man-machine interface part (S308). On the other hand, when the transaction requesting part 45 receives the transaction falling-through notice from the management device 2 (NO in S307), the transaction requesting part 45 performs predetermined error processing such as outputting of a message to the effect that the transaction has fallen through to the man-machine interface part 42 (S309).

Further, when the use permit requesting part 46 receives the use permit request operation accompanied by designation of the transaction ID from the user via the man-machine interface part 42 in a state that its own user terminal 4 has logged in to the management device 2 (YES in S310), the use permit requesting part sends the use permit request that contains the transaction ID designated in the use permit request operation to the management device 2 via the wireless network interface part 40 (S311). When the use permit requesting part 46 receives the use permit together with the second signature from the management device 2 (YES in S312), the use permit requesting part 46 stores the use permit and the second signature in the use permit storage part 432 (S313). On the other hand, when the use permit requesting part 46 receives the issue rejection notice from the management device 2 (NO in S312), the use permit requesting part 46 performs predetermined error processing such as outputting of a message to the man-machine interface part 42 to the effect that issue of the use permit has been rejected (S314).

Further, when the use permit sending part 47 receives the use operation from the user via the man-machine interface part 42 in a state that the Near Field Communication part 41 can communicate with the utilization control device 1 (YES in S315), the use permit sending part 47 reads out the use permit and the second signature from the use permit storage part 432, and sends the use permit and the second signature to the utilization control device 1 via the Near Field Communication part 41 (S316). When the nonce processing part 48 receives the nonce from the utilization control device 1 via the Near Field Communication part 41 (S317), the nonce processing part 48 generates the third signature on the nonce by using the third secret key stored in the key information storage part 431, and sends the third signature to the utilization control device 1 via the Near Field Communication part 41 (S318). Thereafter, the nonce processing part 48 receives a notice (the use restriction lift notice or the error notice) from the utilization control device 1 via the Near Field Communication part 41, and outputs the received notice to the man-machine interface part 42 (S319).

Next, the management device 2 will be described in detail.

Figure 11:
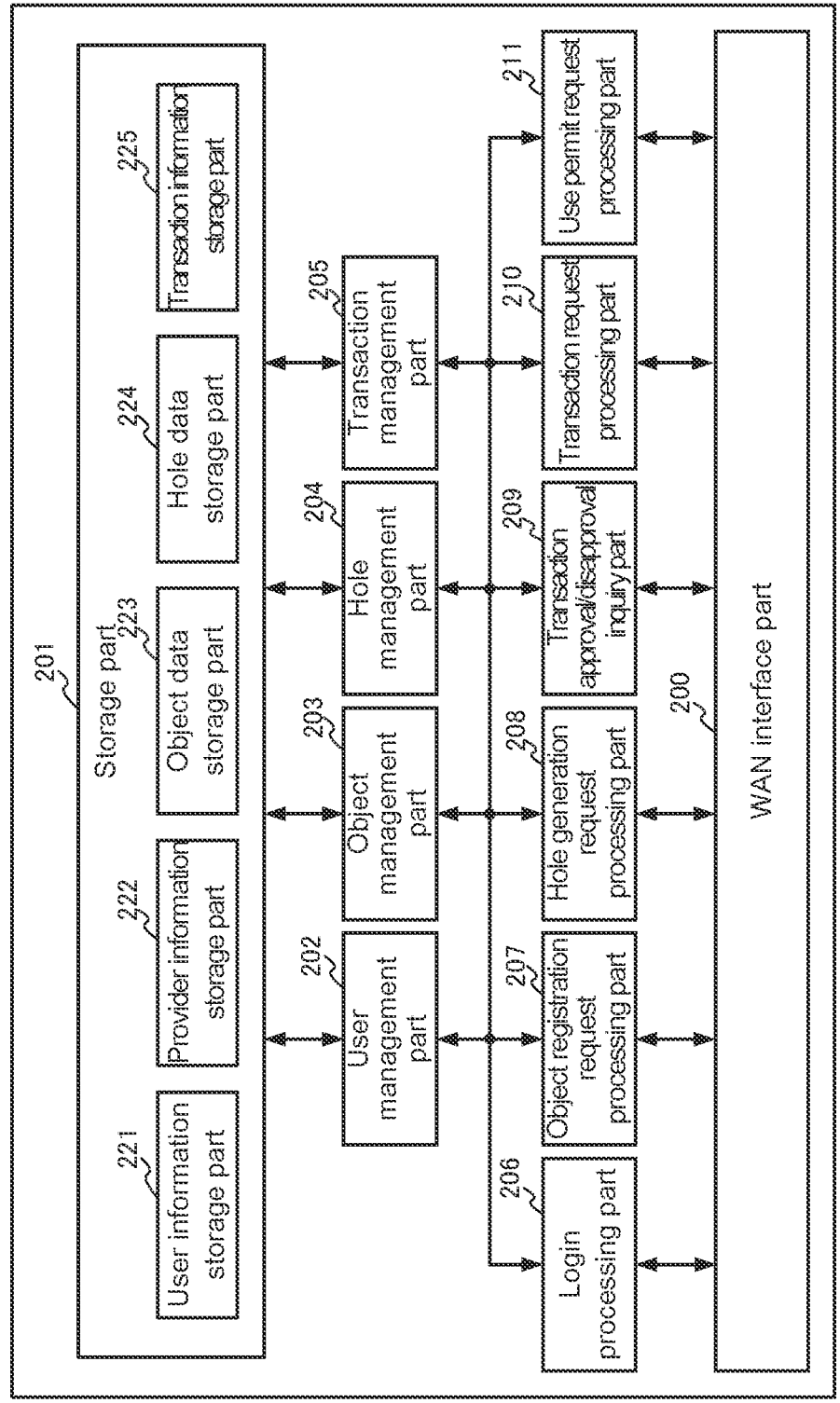
FIG. 11 is a schematic functional configuration diagram of the management device 2.

FIG. 11 is a schematic functional configuration diagram of the management device 2.

As shown in the figure, the management device 2 comprises a WAN interface part 200, a storage part 201, a user management part 202, an object management part 203, a hole management part 204, a transaction management part 205, a login processing part 206, an object registration request processing part 207, a hole generation request processing part 208, a transaction approval/disapproval inquiry part 209, a transaction request processing part 210, and a use permit request processing part 211.

The WAN interface part 200 is an interface for connecting with the WAN 60.

The storage part 201 comprises a user information storage part 221, a provider information storage part 222, an object data storage part 223, a hole data storage part 224, and a transaction information storage part 225.

The user information storage part 221 stores the user information for each user.

FIG. 12 is a diagram showing schematically an example of contents registered in the user information storage part 221.

As shown in the figure, the user information storage part 221 stores a record 2210 of user information for each user. Each record 2210 of user information has a field 2211 for registering a user's user ID, a field 2212 for registering a user's password, a field 2213 for registering address information of the user terminal 4 on the WAN 60, a field 2214 for registering personal information of the user such as a user's name, address, contact information, and the like, and a field 2215 for registering the third public key that pairs with the third secret key held in secret in the user terminal 4.

The provider information storage part 222 stores the provider information for each provider.

FIG. 13 is a diagram showing schematically an example of contents registered in the provider information storage part 222.

As shown in the figure, the provider information storage part 222 stores a record 2220 of provider information for each provider. Each record 2220 of provider information has a field 2221 for registering a provider's user ID, a field 2222 for registering a provider's password, a field 2223 for registering address information of the provider terminal 3 on the WAN 60, and a field 2224 for registering personal information of the user such as a provider's name, address, contact information, and the like.

The object data storage part 223 stores the object data for each utilization control device 1.

FIG. 14 is a diagram showing schematically an example of contents registered in the object data storage part 223.

As shown in the figure, the object data storage part 223 stores a record 2230 of object data for each utilization control device 1. Each record 2230 of object data has a field 2231 for registering the object ID as an identifier, a field 2232 for registering the first public key, a field 2233 for registering the first secret key, a field 2234 for registering the facility information including, for example, a name, an address, and the like of a usage target object (house 50), and a field 2235 for registering the user ID of the provider who provides service for using the usage target object.

The hole data storage part 224 stores the information that includes the hole data for each utilization control device 1.

FIG. 15 is a diagram showing schematically an example of contents registered in the hole data storage part 224.

As shown in the figure, the hole data storage part 224 stores a record 2240 of the hole data for each utilization control device 1. Each record 2240 of hole data has a field 2241 for registering the hole ID as an identifier, a field 2242 for registering the second public key, a field 2243 for registering the second secret key, a field 2244 for registering the common key, and a field 2245 for registering the object ID given to the utilization control device 1 for which the hole data is set. Here, the second public key, the common key, and the object ID registered respectively in the fields 2242, 2244, and 2245 make up the hole data set in the utilization control device 1.

The transaction information storage part 225 stores the transaction information for each transaction established between the provider and the user with respect to provision of service for using a usage target object.

FIG. 16 is a diagram showing schematically an example of contents registered in the transaction information storage part 225.

As shown in the figure, the transaction information storage part 225 stores a record 2250 of the transaction information for each transaction of service for using the usage target object. Each record 2250 of transaction information has a field 2256 for registering the transaction ID as an identifier, a field 2251 for registering the object ID given to the utilization control device 1 installed at the usage target object as an object of transaction of service for using the usage target object, a field 2252 for registering the user's user ID, a field 2253 for registering the provider's user ID, a field 2254 for registering the desire information on use of the usage target object, including desired start and end times of use and the number of times of use, and a field 2255 for registering the use permit obtainable time when it becomes possible to obtain the use permit.

The user management part 202 manages the user information by using the user information storage part 221 and manages the provider information by using the provider information storage part 222.

The object management part 203 manages the object data by using the object data storage part 223.

The hole management part 204 manages the hole data by using the hole data storage part 224.

The transaction management part 205 manages the transaction information by using the transaction information storage part 225.

The login processing part 206 processes the login request received from the provider terminal 3 or the user terminal 4, in cooperation with the user management part 202.

The object registration request processing part 207 processes the object registration request received from the provider terminal 3, in cooperation with the object management part 203.

The hole generation request processing part 208 processes the hole generation request received from the provider terminal 3 in cooperation with the object management part 203 and the hole management part 204.

The transaction approval/disapproval inquiry part 209 inquires approval/disapproval of transaction of service for using the usage target object, from the provider terminal 3 according to an instruction of the transaction request processing part 210.

The transaction request processing part 210 processes the transaction request received from the user terminal 4, in cooperation with the transaction management part 205 and the transaction approval/disapproval inquiry part 209.

The use permit request processing part 211 processes the use permit request received from the user terminal 4, in cooperation with the hole management part 204 and the transaction management part 205.

The schematic functional configuration of the management device 2 shown in FIG. 11 may be implemented by hardware, for example by using an integrated logic IC such as an ASIC, an FPGA, or the like, or by software on a computer device such as a DSP. Or in a general-purpose computer comprising a CPU, a memory, an auxiliary storage such as a flash memory or a hard disk drive, and a communication device such as a Network Interface Card (NIC), or the like, the schematic functional configuration may be implemented by the CPU loading a prescribed program from the auxiliary storage into the memory and executes the program. Further, the schematic functional configuration may be implemented on a distributed system comprising a plurality of general-purpose computers that cooperate with one another.

Figure 17:
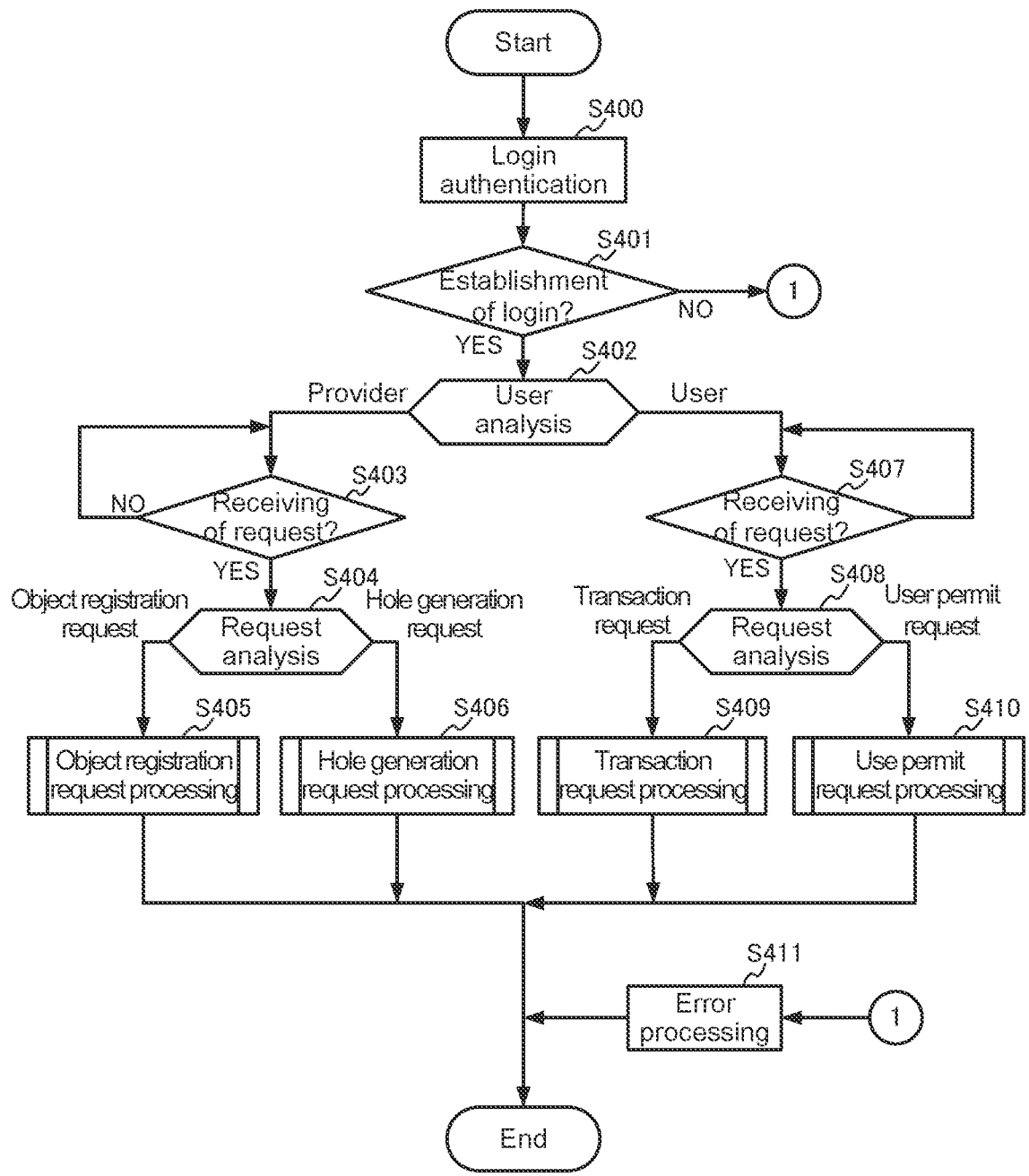
FIG. 17 is a flowchart for explaining operation of the management device 2.

FIG. 17 is a flowchart for explaining operation of the management device 2.

The flow is started when the WAN interface part 200 receives the login request from the provider terminal 3 or the user terminal 4 via the WAN 60.

First, the WAN interface part 200 notifies the received login request to the login processing part 206. Receiving this, the login processing part 206 performs authentication processing (S400).

In detail, in the case where the login request is received from the provider terminal 3, the login processing part 206 notifies the user management part 202 of a password search accompanied by designation of the provider's user ID included in the login request. Receiving this, the user management part 202 searches the provider information storage part 222 for the record 2220 by using as a key the provider's user ID designated by the login processing part 206. When the searched record 2220 can be detected, the user management part 202 notifies the password registered in the searched record 2220 to the login processing part 206. Or, when the searched record 2220 cannot be detected, the user management part 202 notifies the login processing part 206 to the effect that the searched record does not exist. On the other hand, in the case where the login request is received from the user terminal 4, the login processing part 206 notifies the user management part 202 of a password search accompanied by designation of the user's user ID included in the login request. Receiving this, the user management part 202 searches the user information storage part 221 for the record 2210 by using as a key the user's user ID designated by the login processing part 206. When the searched record 2210 can be detected, the user management part 202 notifies the password registered in the searched record 2210 to the login processing part. Or, when the searched record 2210 cannot be detected, the user management part 202 notifies the login processing part 206 to the effect that the searched record does not exist. When the password received from the user management part 202 coincides with the password included in the received login request, the login processing part 206 permits the login (authentication is established). When the passwords received from the user management part 202 do not coincide with the password included in the received login request, or when the nonexistence of the searched record is notified from the user management part 202, the login processing part 206 rejects the login (authentication is not established).

In the case where the authentication is not established (NO in S401), the login processing part 206 performs predetermined error processing such as sending of an error message to the sender of the login request via the WAN interface part 200 (S411). On the other hand, in the case where the authentication is established (YES in S401), the login processing part 206 sends the login permission notice to the sender of the login request via the WAN interface part 200, and manages a login state of the sender of the login request. In the case where the sender of the login request is the provider terminal 3 ("Provider" in S402), the flow proceeds to S403, while in the case where the sender is the user terminal 4 ("User" in S402), the flow proceeds to S407.

In S403, the WAN interface part 200 waits for receiving of a request sent from the provider terminal 3 that is the destination of the login permission notice. In the case where the request received from the provider terminal 3 is the object registration request ("Object registration request" in S404), the WAN interface part 200 notifies the object registration request processing part 207 of the object registration request together with the provider's user ID included in the login request received from the provider terminal 3, to perform the below-described object registration request processing (S405). On the other hand, in the case where the request received from the provider terminal 3 is the hole generation request ("Hole generation request" in S404), the WAN interface part 200 notifies the hole generation request processing part 208 of the hole generation request together with the provider's user ID included in the login request received from the provider terminal 3, to perform the below-described hole generation request processing (S406).

Further, in S407, the WAN interface part 200 waits for receiving of a request sent from the user terminal 4 that is the destination of the login permission notice. In the case where the request received from the user terminal 4 is the transaction request ("Transaction request" in S408), the WAN interface part 200 notifies the transaction request processing part 210 of the transaction request together with the user's user ID included in the login request received from the user terminal 4, to perform the below-described transaction request processing (S409). On the other hand, in the case where the received request is the use permit request ("Use permit request" in S408), the WAN interface part 210 notifies the use permit request processing part 211 of the use permit request together with the user's user ID included in the login request received from the user terminal 4, to perform the below-described use permit request processing (S410).

Figure 18:
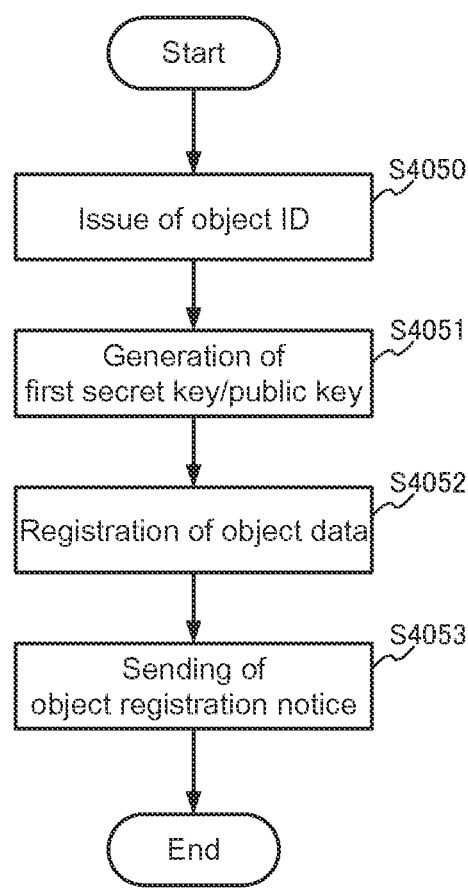
FIG. 18 is a flowchart for explaining the object registration request processing S405 shown in FIG. 17.

FIG. 18 is a flowchart for explaining the object registration request processing S405 shown in FIG. 17.

First, the object registration request processing part 207 issues the object ID (S4050), and generates the first secret key/first public key according to the public key cryptosystem (S4051). Then, the object registration request processing part 207 generates the object data that includes the object ID, the first secret key/first public key, and the facility information included in the object registration request, and notifies the object management part 203 of the object data together with the provider's user ID, and instructs the object management part 203 to manage the object data.

Receiving this, the object management part 203 adds the record 2230 of the object data to the object data storage part 223 to register the object data (the object ID, the first public key, the first secret key, and the facility information) in the added record 2230, association with the provider's user ID (S4052). Then, the object management part 203 notifies the object registration request processing part 207 of the object ID and the first public key.

Next, the object registration request processing part 207 generates the object registration notice that includes the object ID and the first public key notified from the object management part 203, and sends the object registration notice to the provider terminal 3, i.e., the sender of the object registration request (S4053).

FIG. 19 is a flowchart for explaining the hole generation request processing S406 shown in FIG. 17.

First, the hole generation request processing part 208 issues the hole ID (S4060). Further, the hole generation request processing part 208 generates the second secret key/second public key according to the public key cryptosystem (S4061) and the common key according to the common key cryptosystem (S4062).

Next, the hole generation request processing part 208 generates the hole data that includes the object ID included in the hole generation request, the second public key, and the common key, and notifies the hole management part 204 of the hole data together with the hole ID and the second secret key, and instructs the hole management part 204 to manage the hole data. Receiving this, the hole management part 204 adds the record 2240 of the hole data to the hole data storage part 224 to register the hole data (the object ID, the second public key, and the common key) in the added record 2240, together with the hole ID and the second secret key (S4063).

Next, the hole generation request processing part 208 notifies the management part 203 of the object ID included in the hole generation request, and instructs the object management part 203 to search for the first secret key. Receiving this, the object management part 203 searches the object data storage part 223 for the record 2230 of the object data by using the object ID as a key, and notifies the hole generation request processing part 208 of the first secret key included in the detected record 2230. Then, the hole generation request processing part 208 generates the first signature on the hole data by using the first secret key notified from the object management part 203 (S4064).

Then, the hole generation request processing part 208 sends the hole data together with the first signature to the provider terminal 3 as the sender of the hole generation request (S4065).

FIG. 20 is a flowchart for explaining the transaction request processing S409 shown in FIG. 17.

First, the transaction request processing part 210 notifies the user management part 202 of the provider's user ID included in the transaction request, and instructs the user management part 202 to identify the provider terminal 3 of the provider that becomes the transaction partner. Receiving this, the user management part 202 searches the provider information storage part 222 for the record 2220 of the provider by using the provider's user ID as a key. Then, the user management part 202 notifies the transaction request processing part 210 of the address information of the provider terminal 3 included in the detected record 2220 (S4090).

Next, the transaction request processing part 210 notifies the transaction approval/disapproval inquiry part 209 of the object ID of the utilization control device 1 and the desire information on use of the usage target object included in the transaction request together with the address information notified from the user management part 202, and instructs the transaction approval/disapproval inquiry part 209 to inquire approval/disapproval of the transaction. Receiving this, the transaction approval/disapproval inquiry part 209 generates the transaction approval/disapproval inquiry that includes the object ID of the utilization control device 1 and the desire information on use of the usage target object, and sends the transaction approval/disapproval inquiry to the provider terminal 3 identified by the address information notified from the user management part 202 via the WAN interface part 200 (S4091). Then, when the transaction approval/disapproval inquiry part 209 receives a response to the transaction approval/disapproval inquiry from the provider terminal 3 (YES in S4092), the transaction approval/disapproval inquiry part 209 notifies the received response to the transaction request processing part 210.

In the case where the response to the transaction approval/disapproval inquiry is a transaction rejection response (NO in S4093), the transaction request processing part 210 performs predetermined error processing such as sending of an error message to the user terminal 4 as the sender of the transaction request via the WAN interface part 200 (S4097).

On the other hand, in the case where the response to the transaction approval/disapproval inquiry is a transaction acceptance response (YES in S4093), the transaction request processing part 210 determines that the transaction has been established to issue the transaction ID, and determines the use permit obtainable time based on the desired start time of use in the desire information on use of the usage target object included in the transaction request (S4094). For example, the time 24 hours before the desired start time of use is determined as the use permit obtainable time.

Then, the transaction request processing part 210 generates the transaction information that includes the transaction ID, the user's user ID, and the provider's user ID, the object ID, and the desire information on use of the usage target object included in the transaction request, and the use permit obtainable time. Then, the transaction request processing part 210 instructs the transaction management part 205 to manage the generated transaction information. Receiving this, the transaction management part 205 adds the record 2250 of the transaction information to the transaction information storage part 225 to register the transaction information (the transaction ID, the object ID, the user's user ID, the provider's user ID, the desire information on use of the usage target object, and the use permit obtainable time) in the added record 2250 (S4095).

Next, the transaction processing part 210 sends the transaction establishment notice that includes the transaction information to the user terminal 4 as the sender of the transaction request (S4096).

FIG. 21 is a flowchart for explaining the use permit request processing S410 shown in FIG. 17.

First, the use permit request processing part 211 notifies the transaction management part 205 of the transaction ID included in the use permit request, and instructs the transaction management part 205 to search for the transaction information. Receiving this, the transaction management part 205 searches the transaction information storage part 225 for the record 2250 of the transaction information by using the transaction ID as a key. The transaction management part 205 notifies the use permit request processing part 211 of the transaction information registered in the retrieved record 2250 (S4100).

Next, the use permit request processing part 211 confirms that the user's user ID included in the transaction information notified from the transaction management part 205 is the user ID of the user of the user terminal 4 as the sender of the use permit request (i.e., the user's user ID notified from the login processing part 206), and confirms that the present time is after the use permit obtainable time included in the transaction information (S4101).

In the case where the user's user ID included in the transaction information is not the user ID of the user of the user terminal 4 as the sender of the use permit request or where the present time is before the use permit obtainable time included in the transaction information (NO in S4101), the use permit request processing part 211 performs predetermined error processing such as sending of an error message to the user terminal 4 as the sender of the use permit request via the WAN interface part 200 (S4108).

On the other hand, in the case where the user's user ID included in the transaction information is the user ID of the user of the user terminal 4 as the sender of the use permit request and the present time is after the use permit obtainable time included in the transaction information (YES in S4101), the use permit request processing part 211 notifies the hole management part 204 of the object ID included in the identified transaction information, and instructs the hole management part 204 to search for the common key and the second secret key. Receiving this, the hole management part 204 searches the hole data storage part 224 for the record 2240 of the hole data by using the object ID as a key. Then, the hole management part 204 notifies the use permit request processing part 211 of the common key and the second secret key included in the detected record 2240 (S4102).

Further, the use permit request processing part 211 notifies the user management part 202 of the user's user ID included in the identified transaction information, and instructs the user management part 202 to search for the third public key. Receiving this, the user management part 202 searches the user information storage part 221 for the record 2210 of the user information by using the user ID as a key. Then, the user management part 202 notifies the use permit request processing part 211 of the third public key included in the detected record 2210 (S4103).

Next, the use permit request processing part 211 encrypts the transaction information by using the common key notified from the hole management part 204 (S4104), and generates the user permit that includes the encrypted transaction information and the third public key notified from the user management part 202 (S4105). Then, the use permit request processing part 211 generates the second signature on the use permit by using the second secret key notified from the hole management part 204 (S4106).

Next, the use permit request processing part 211 sends the use permit and the second signature to the user terminal 4 as the sender of the use permit request (S4107).

Hereinabove, one embodiment of the present invention has been described.

In the present embodiment, the utilization control device 1 can communicate only via the Near Field Communication 63, and is separated from the WAN 60. Accordingly, the utilization control device 1 is not attacked from the outside via the WAN 60. Further, the use permit used for lifting the restriction on use of the house 50 as the usage target object is validated by verifying the second signature attached to the use permit by using the second public key included in the hole data. Further, the hole data is validated by verifying the first signature attached to the hole data by using the first public key. Further, the user terminal 4 generates the third signature on the nonce obtained from the utilization control device 1 by using the third secret key, and the utilization control device 1 verifies the third signature obtained from the user terminal 4 by using the third public key included in the use permit, in order to validate the user terminal 4 as the recipient of the use permit. Thus, according to the present embodiment, the security risk is reduced.

Further, in the present embodiment, the restriction on use of the usage target object is lifted only when the desire information on use of the usage target object that is in the transaction information included in the use permit is satisfied. When the desire information is not satisfied, the restriction on use of the usage target object is not lifted. Accordingly, by including conditions such as a usable period (desired start and end times of use), the number of times of use, and the like, in the desire information on use of the usage target object in the transaction information, the use permit that does not satisfy these conditions becomes invalid even though the use permit has been authenticated. As a result, it is not necessary for the user of the usage target object (i.e., the user of the user terminal 4) to return the use permit. Thus, according to the present embodiment, the convenience is improved.

Thus, according to the present embodiment, it is possible to improve the convenience while reducing the security risk in use management of the usage target object.

Further, in the present embodiment, the management device 2 manages the transaction information that includes the use permit obtainable time. When the management device 2 receives the use permit request from the user terminal 4, the management device 2 generates the use permit if it is after the use permit obtainable time included in the transaction information identified by the transaction ID designated in the use permit request. Thus, by limiting the time at which the use permit becomes obtainable, it is possible to reduce a chance of, for example, falsifying the use permit and to improve the security.

Further, in the present embodiment, when the management device 2 receives the transaction request from the user terminal 4, the management device 2 sends the transaction approval/disapproval inquiry that includes the desire information on use of the usage target object included in the transaction request to the provider terminal 3. Then, when the management device 2 receives the transaction acceptance response as a response to the transaction approval/disapproval inquiry from the provider terminal 3, the management device 2 generates the transaction information, and sends the transaction establishment notice that includes the use permit obtainable time included in the transaction information to the user terminal 4. Accordingly, for each transaction (provision) of the service for using the usage target object, the provider can show his will to accept or reject the transaction. On the other hand, the user can know the use permit obtainable time only when the transaction is established. Accordingly, the convenience of both the provider and the user of the service for using the usage target object is improved furthermore.

The present invention is not limited to the above embodiment, and can be changed variously within the scope of the invention.

For example, in the above embodiment, when the utilization control device 1 receives the use permit and the second signature from the user terminal 4, the utilization control device 1 sends the nonce to the user terminal to obtain the third signature from the user terminal 4, and verifies both the second and third signatures. The present invention, however, is not limited to this. One of the second and third signatures may be verified first. Then, only when this verification is established, the other signature can be verified. For example, prior to sending the nonce to the user terminal 4, the utilization control device 1 may verify the second signature, and then, if this verification is established, the utilization control device 1 sends the nonce to the user terminal 4 to obtain the third signature, and then verifies the third signature.

Further, in the above embodiment, the common key shared between the management device 2 and the utilization control device 1 is used. Using the common key, the management device 2 encrypts the transaction information included in the use permit sent to the user terminal 4, and the utilization control device 1 decrypts the encrypted transaction information included in the use permit received from the user terminal 4. The present invention, however, is not limited to this. Without being encrypted, the transaction information may be sent as plain text from the management device 2 to the utilization control device 1 via the user terminal 4.

Further, the above embodiment has been described by taking an example where the desired start and end times of use and the number of times of use are used as the desire information on use of the usage target object included in the transaction information. The present invention, however, is not limited to this. It is sufficient that the desire information on use of the usage target object designates a condition for lifting the restriction on use of the usage target object, and thus may include only the desired start and end times or only the number of times of use. Or, the desire information on use of the usage target object may include another condition instead of the desired start and end times and the number of times of use, or instead of either of them.

Further, in the above embodiment, the storage part 201 is placed in the management device 2. The present invention, however, is not limited to this. The storage part 201 may be held by a file server connected with the WAN 60. In this case, the user information storage part 221, the provider information storage part 222, the object data storage part 223, the hole data storage part 224, and the transaction information storage part 225 may be held by respective different file servers. Or, each storage part may be divided into a plurality of parts held by a plurality of file servers in a distributed manner. Further, it is favorable that the blockchain technology or the like is used to ensure validity of information stored in these storage parts 221-225.

Further, the above embodiment has been described by taking an example where the utilization control device 1 is used for unlocking the automatic lock installed at the entrance 51 of the house 50 as the usage target object. The present invention, however, is not limited to this. The usage target object may be a hotel, an inn, a guesthouse, a warehouse, a room, or the like, and the utilization control device 1 may be used for unlocking an automatic lock installed at an entrance of such the usage target object. Or, the usage target object may be a moving body such as an automobile or a bicycle, or the like, and the utilization control device may be used for unlocking a door of the moving body or for starting the ignition of the moving body. Or, the usage target object may be a browsing terminal for viewing an electronic medium containing an electronic medical record, an electronic book, or the like, and the utilization control device 1 may be used for lifting restriction on access to the electronic medium or for decrypting the encrypted electronic medium. For example, the usage target object may be a depository that stores an electronic or non-electronic record medium storing secret information or the like, and the utilization control device 1 may be used for lifting restriction on access to the record medium. In these cases, the utilization control device 1 may record a log of access to the medium.

REFERENCE SIGNS LIST

1: utilization control device; 2: management device; 3: provider terminal; 4: user terminal; 10: Near Field Communication part; 11: setting information et cetera storage part; 12: object setting part; 13: hole setting part; 14: signature obtaining part; 15: use restriction lifting part; 16: signature verification part; 17: decryption part; 40: wireless network interface part; 41: Near Field Communication part; 42: man-machine interface part; 43: storage part; 44: login requesting part; 45: transaction requesting part; 46: use permit requesting part; 47: use permit sending part; 48: nonce processing part; 50: house; 51: entrance; 60: WAN; 61: relay device; 62: wireless network; 63: Near Field Communication; 200: WAN interface part; 201: storage part; 202: user management part; 203: object management part; 204: hole management part; 205: transaction management part; 206: login processing part; 207: object registration request processing part; 208: hole generation request processing part; 209: transaction approval/disapproval inquiry part; 210: transaction request processing part; 211: use permit request processing part; 221: user information storage part; 222: provider information storage part; 223: object data storage part; 224: hole data storage part; 225: transaction information storage part; 430 login information storage part; 431: key information storage part; and 432: use permit storage part.

The invention claimed is:

1. A utilization management system configured to manage a usage target object, comprising:
    a utilization control device configured to control the usage target object by locking/unlocking, access control, or encrypting/decrypting based on a use permit;
    a management device configured to manage the usage target object associated with the utilization control device;
    a provider terminal configured to set hole data required for verification of the use permit in the utilization control device; and
    a user terminal configured to notify the utilization control device of the use permit,
    wherein, the management device comprises at least one processor configured to execute a computer readable instruction so as to:
    manage transaction information including conditions for a use of the usage target object,
    manage a first secret key/first public key associated with the utilization control device,
    manage a second secret key/second public key associated with the utilization control device,
    manage a third public key associated with the user terminal,
    generate a first signature for the hole data by using the first secret key and send the hole data with the first signature to the provider terminal, the hole data including the second public key, and
    generate a second signature for the use permit and the third public key by using the second secret key and send the use permit and the second signature to the user terminal, the use permit including the transaction information,
    wherein the provider terminal is configured to send the hole data with the first signature received from the management device to the utilization control device via Near Field Communication, wherein the user terminal comprises at least one processor configured to execute a computer readable instruction so as to:
- store a third secret key that pairs with the third public key and is associated with the user terminal, the third public key being stored in the management device,
- send the use permit and the second signature received from the management device to the utilization control device via the Near Field Communication,
- generate a third signature for a nonce received from the utilization control device by using the third secret key, and
- send the third signature to the utilization control device via the Near Field Communication, and wherein the utilization control device is configured to communicate only via the Near Field Communication and comprises at least one processor configured to execute a computer readable instruction so as to:
- verify the first signature received together with the hole data from the provider terminal by using the first public key and set the hole data in the utilization control device when the first signature and the hole data have been verified,
- send the nonce to the user terminal to obtain the third signature from the user terminal when the use permit and the second signature are received from the user terminal,
- verify the second signature received together with the use permit from the user terminal, by using the second public key included in the hole data set in the utilization control device and verify the third signature by using the third public key included in the use permit to obtain the transaction information included in the use permit when the second and third signatures have been verified, and
- lift a restriction on use of the usage target object by referring to the transaction information when the conditions specified by the transaction information are satisfied.

2. The utilization management system according to claim 1,
wherein the at least one processor of the management device is further configured to execute the computer readable instruction so as to:
- manage the transaction information with a use permit obtainable time that is included in the transaction information, and
- when a use permit request accompanied by a designation of the transaction information is received from the user terminal and it is after the use permit obtainable time included in the transaction information designated by the use permit request:
- generate the use permit that includes the transaction information and the third public key,
- generate the second signature for the use permit by using the second secret key, and
- send the use permit and the second signature to the user terminal.

3. The utilization management system according to claim 2, wherein,
the at least one processor of the management device is configured to further execute the computer readable instruction so as to:
- send to the provider terminal a transaction approval/disapproval inquiry, including the conditions for a use of the usage target object, to inquire transaction approval/disapproval of a service for using the usage target object, when a use request including the conditions for a use of the usage target object is received from the user terminal, and
- generate the transaction information including the conditions for a use of the usage target object included in the transaction approval/disapproval inquiry and the use permit obtainable time, and
- send a transaction establishment notice that includes the use permit obtainable time, when a transaction approval response is received from the provider terminal as a response to the transaction approval/disapproval inquiry received by the provider terminal.

4. The utilization management system according to claim 1,
wherein,
the at least one processor of the management device is further configured to execute the computer readable instruction so as to:
- generate the second secret key/second public key and generate the first signature for the hole data by using the first secret key, and
- send the hole data and the first signature to the provider terminal when a hole generation request accompanied by designation of the utilization control device is received from the provider terminal, the hole data including the second public key.

5. The utilization management system according to claim 1,
wherein the at least one processor of the management device is further configured to execute the computer readable instruction so as to:
- generate the first secret key/first public key and send an object registration notification that includes the first public key to the provider terminal when an object registration request accompanied by designation of the utilization control device is received from the provider terminal,
wherein the provider terminal is configured to send the object registration notification received from the management device to the utilization control device via the Near Field Communication, and
wherein the utilization control device is configured to register the first public key included in the object registration notification received from the provider terminal.

6. The utilization management system according to claim 1, wherein,
the at least one processor of the management device is further configured to execute the computer readable instruction so as to:
- manage a common key associated with the utilization control device,
- encrypt the transaction information included in the use permit by using the common key, and
- include the common key in the hole data and send the hole data with the common key to the utilization control device, and
the at least one processor of the utilization control device is further configured to execute the computer readable instruction so as to:
- decrypt the encrypted transaction information included in the use permit by using the common key included in the hole data sent by the management device.

7. The utilization management system according to claim 2,
the at least one processor of the management device is further configured to execute the computer readable instruction so as to:
generate the second secret key/second public key and generate the first signature for the hole data by using the first secret key, and send the hole data and the first signature to the provider terminal when a hole generation request accompanied by designation of the utilization control device is received from the provider terminal, the hole data including the second public key.

8. The utilization management system according to claim 3, wherein,
the at least one processor of the management device is further configured to execute the computer readable instructions so as to:
generate the second secret key/second public key and generate the first signature for the hole data by using the first secret key to send the hole data and the first signature to the provider terminal, when a hole generation request accompanied by designation of the utilization control device is received from the provider terminal, the hole data including the second public key.

9. The utilization management system according to claim 2, wherein,
the at least one processor of the management device is further configured to execute the computer readable instructions so as to:
generate the first secret key/first public key and send an object registration notification that includes the first public key to the provider terminal when the object registration an object registration request accompanied by designation of the utilization control device is received from the provider terminal;
the provider terminal is configured to send the object registration notice notification received from the management device to the utilization control device via the Near Field Communication; and
the utilization control device is configured to register the first public key included in the object registration notification received from the provider terminal.

10. The utilization management system according to claim 3, wherein,
the at least one processor of the management device is further configured to execute the computer readable instructions so as to:
generate the first secret key/first public key and send an object registration notification that includes the first public key to the provider terminal when an object registration request accompanied by designation of the utilization control device is received from the provider terminal;
the provider terminal is configured to send the object registration notification received from the management device to the utilization control device via the Near Field Communication; and
the utilization control device is configured to register the first public key included in the object registration notification received from the provider terminal.

11. The utilization management system according to claim 4, wherein,
the at least one processor of the management device is further configured to execute the computer readable instructions so as to:
generate the first secret key/first public key and send an object registration notification that includes the first public key to the provider terminal when an object registration request accompanied by designation of the utilization control device is received from the provider terminal;
the provider terminal is configured to send the object registration notification received from the management device to the utilization control device via the Near Field Communication; and
the utilization control device is configured to register the first public key included in the object registration notification received from the provider terminal.

12. The utilization management system according to claim 2, wherein,
the at least one processor of the management device is further configured to execute the computer readable instructions so as to:
manage a common key associated with the utilization control device,
send the hole data that includes the common key, and
encrypt the transaction information included in the use permit, by using the common key, and
the at least one processor of the utilization control device is further configured to execute the computer readable instructions so as to:
decrypt the encrypted transaction information included in the use permit, by using the common key included in the hole data set in the utilization control device.

13. The utilization management system according to claim 3, wherein,
the at least one processor of the management device is further configured to execute the computer readable instructions so as to:
manage a common key associated with the utilization control device,
send the hole data that includes the common key, and
encrypt the transaction information included in the use permit, by using the common key, and
the at least one processor of the utilization control device is further configured to execute the computer readable instructions so as to:
decrypt the encrypted transaction information included in the use permit, by using the common key included in the hole data set in the utilization control device.

14. A management device configured to manage a utilization control device configured to control a usage target object by locking/unlocking, access control, or encrypting/decrypting, based on a use permit, the management device comprising:
at least one processor configured to execute a computer readable instruction so as to:
manage transaction information including conditions for a use of the usage target object,
manage a first secret key/first public key associated with the utilization control device,
manage a second secret key/second public key associated with the utilization control device,
manage a third public key associated with a user terminal that is configured to notify the utilization control device of a use permit,
generate a first signature for hole data required for verification of the use permit by using the first secret key to send the hole data and the first signature to a provider terminal, the hole data including the second public key, and
generate a second signature for the use permit by using the second secret key to send the use permit and the second signature to the user terminal, the use permit including the transaction information and the third public key.

15. A utilization control device configured to control use of a usage target object by locking/unlocking, access control, or encrypting/decrypting, based on a use permit, wherein,
the utilization control device is configured to communicate only via Near Field Communication, the utilization control device comprising:
at least one processor configured to execute a computer readable instruction so as to:
verify a first signature received from a provider terminal together with hole data required for verification of the use permit, by using a pre-registered first public key, to set the hole data in the utilization control device when the first signature and the hole data have been verified,
send a nonce to a user terminal to obtain a third signature from the user terminal when the use permit is received together with a second signature from the user terminal,
verify the second signature received together with the use permit from the user terminal, by using a second public key included in the hole data set in the utilization control device, and verify the third signature, by using a third public key included in the use permit, to obtain transaction information included in the use permit when the second and third signatures have been verified, and
lift a restriction on use of the usage target object when conditions specified by the transaction information are satisfied.

16. A user terminal configured to notify a utilization control device that is configured to control use of a usage target object by locking/unlocking, access control, or encrypting/decrypting based on a use permit obtained from a management device configured to manage the utilization control device, the user terminal comprising:
at least one processor configured to execute a computer readable instruction so as to:
store a third secret key that pairs with a third public key stored in the management device and associated with the user terminal,
send the use permit and a second signature received from the management device to the utilization control device via Near Field Communication, and
generate a third signature on a nonce received from the utilization control device by using the third secret key to send the third signature to the utilization control device via Near Field Communication.

17. A utilization management method of managing use of a usage target object, by using a utilization control device that controls use of the usage target object by locking/unlocking, access control, or encrypting/decrypting, a management device that manages a usage target object associated with the utilization control device, a provider terminal that sets hole data required for verification of the use permit in the utilization control device, and a user terminal that notifies the utilization control device of the use permit, wherein,
the management device:
manages transaction information that includes conditions on use of the usage target object, a first secret key/first public key and a second secret key/second public key in association with the utilization control device, and a third public key in association with the user terminal;
generates a first signature for the hole data including the second public key, by using the first secret key, to send the hole data and the first signature to the provider terminal; and
generates a second signature for the use permit including the transaction information and the third public key, to send the use permit and the second signature to the user terminal,
the provider terminal:
sends the hole data and the first signature received from the management device to the utilization control device via Near Field Communication,
the user terminal:
sends the use permit and the second signature received from the management device to the utilization control device via the Near Field Communication; and
on receiving a nonce from the utilization control device, generates a third signature on the nonce by using a third secret key registered previously, to send the third signature to the utilization control device via the Near Field Communication, and
the utilization control device:
communicates only via the Near Field Communication;
verifies the first signature received together with the hole data from the provider terminal, by using the first public key, to set the hole data in the utilization control device when the verification being established;
verifies the second signature received together with the use permit from the user terminal, by using the second public key included in the hole data set in the utilization control device device;
sends the nonce to the user terminal to receive the third signature from the user terminal;
verifies the third signature by using the third public key included in the use permit; and
refers to the transaction information included in the use permit when verifications of both the second and third signatures being established to lift restriction on use of the usage target object when the conditions specified by the transaction information being satisfied.

18. A computer program product embodying computer readable instructions stored on a non-transitory computer readable medium configured to cause a computer to function as a management device that manages a utilization control device controlling use of a usage target object by locking/unlocking, access control, or encrypting/decrypting, based on a use permit,
wherein the computer executes the computer readable instructions so as to:
manage transaction information including conditions for use of the usage target object,
manage a first secret key/first public key associated with the utilization control device,
manage a second secret key/second public key associated with the utilization control device
manage a third public key associated with a user terminal configured to notify the use permit to the utilization control device
generate a first signature for hole data required for verification of the use permit, the hole data including the second public key and being managed by using the first secret key to send the hole data and the first signature to a provider terminal, and
generate a second signature for the use permit that contains the transaction information and the third public key by using the second secret key to send the use permit and the second signature to the user terminal.

19. A computer program product embodying computer readable instructions stored on a non-transitory computer readable medium configured to cause a computer to function as a utilization control device controlling use of a usage target object by locking/unlocking, access control, or encrypting/decrypting, based on a use permit and communicates only via Near Field Communication, wherein the computer is configured to execute the computer readable instructions so as to:

verify a first signature received together with hole data required for verifying the use permit from a provider terminal, by using a pre-registered a first public key, to set the hole data in the utilization control device when verification is established, send a nonce to a user terminal to obtain a third signature from the user terminal when the use permit is received together with a second signature from the user terminal, verify the second signature received together with the use permit from the user terminal, by using a second public key included in the hole data set in the utilization control device, and verify the third signature by using a third public key included in the use permit, to obtain transaction information included in the use permit when the second and third signatures are verified, and lift restriction on use of the usage target object when conditions specified by the transaction information are satisfied.

\* \* \* \* \*